(12) United States Patent
Murakami

(10) Patent No.: US 8,675,147 B2
(45) Date of Patent: Mar. 18, 2014

(54) PROTECTION PANEL PROVIDED WITH TOUCH INPUT FUNCTION FOR DISPLAY WINDOW OF ELECTRONIC DEVICE, AND MANUFACTURING METHOD THEREFOR

(75) Inventor: Hideki Murakami, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 65 days.

(21) Appl. No.: 13/142,146

(22) PCT Filed: Dec. 24, 2009

(86) PCT No.: PCT/JP2009/071433
§ 371 (c)(1),
(2), (4) Date: Jun. 24, 2011

(87) PCT Pub. No.: WO2010/074144
PCT Pub. Date: Jul. 1, 2010

(65) Prior Publication Data
US 2011/0255227 A1    Oct. 20, 2011

(30) Foreign Application Priority Data

Dec. 26, 2008  (JP) ................. 2008-332482

(51) Int. Cl.
*G02F 1/1335* (2006.01)
*G02F 1/1333* (2006.01)
*G06F 3/041* (2006.01)
*F21V 7/04* (2006.01)

(52) U.S. Cl.
USPC ............ 349/12; 349/58; 345/173; 362/632; 362/633; 362/634

(58) Field of Classification Search
USPC .............. 349/12, 58; 361/728–730, 679, 681, 361/714, 752, 644; 178/18.01; 345/104, 345/173, 905; 359/609, 601, 507, 511; 313/582–587, 498–512; 348/794, 348/E5.128; 362/632–634
See application file for complete search history.

(56) References Cited

U.S. PATENT DOCUMENTS 5,479,285 A    12/1995  Burke
6,088,069 A *  7/2000   Farlow ........................... 349/12
(Continued)

FOREIGN PATENT DOCUMENTS

DE    102 04 999    8/2003
EP    1 698 965     9/2006
(Continued)

OTHER PUBLICATIONS

International Preliminary Report on Patentability issued Aug. 25, 2011 in International (PCT) Application No. PCT/JP2009/071433.
(Continued)

*Primary Examiner* — Bumsuk Won
*Assistant Examiner* — Jia Pan
(74) *Attorney, Agent, or Firm* — Wenderoth, Lind & Ponack, L.L.P.

(57) ABSTRACT

A protection panel provided with a touch input function for a display window of an electronic device includes: a protection panel main body having an opening punched out, and a glass plate fitted in the opening, a lower electrode sheet having a lower transparent electrode, and a lower circuit, the lower electrode sheet being attached to an upper surface of the protection panel main body, an upper electrode sheet having an upper transparent electrode, and an upper circuit, the upper electrode sheet being bonded to the lower electrode sheet at peripheral edges thereof, and a decorative sheet having a decorative layer provided on at least one surface of a transparent resin film so as to hide the lower circuit and the upper circuit and form the transparent window portion, the decorative sheet being attached to an upper surface of the upper electrode sheet.

5 Claims, 20 Drawing Sheets

(56) References Cited

U.S. PATENT DOCUMENTS

| | | | |
|---|---|---|---|
| 6,798,467 B2* | 9/2004 | Tasaki et al. | 349/58 |
| 7,336,494 B2* | 2/2008 | Nishimura et al. | 361/714 |
| 7,626,808 B2* | 12/2009 | Tai et al. | 361/679.21 |
| 7,903,195 B2* | 3/2011 | Sasaki et al. | 349/62 |
| 7,952,862 B2* | 5/2011 | Sakai | 361/679.21 |
| 8,077,264 B2* | 12/2011 | Nishikawa et al. | 349/12 |
| 8,212,791 B2* | 7/2012 | Kusuda et al. | 345/173 |
| 2002/0000979 A1* | 1/2002 | Furuhashi et al. | 345/173 |
| 2007/0030254 A1 | 2/2007 | Robrecht et al. | |
| 2007/0181456 A1* | 8/2007 | Kusuda et al. | 206/443 |
| 2008/0007538 A1* | 1/2008 | Kotera et al. | 345/173 |
| 2008/0246741 A1* | 10/2008 | Hinata | 345/173 |

FOREIGN PATENT DOCUMENTS

| | | |
|---|---|---|
| JP | 4-326419 | 11/1992 |
| JP | 2003-67123 | 3/2003 |
| WO | 2005/064451 | 7/2005 |

OTHER PUBLICATIONS

International Search Report issued Mar. 2, 2010 in International (PCT) Application No. PCT/JP2009/071433.

* cited by examiner

PROTECTION PANEL PROVIDED WITH TOUCH INPUT FUNCTION FOR DISPLAY WINDOW OF ELECTRONIC DEVICE, AND MANUFACTURING METHOD THEREFOR

TECHNICAL FIELD

The present invention relates to a protection panel provided with a touch input function for a display window of an electronic device, which is applied to a handheld information terminal such as a PDA (personal digital assistant) or a handy terminal, an OA (office automation) device such as a copier or a facsimile, a smartphone, a mobile phone, a handheld game machine, an electronic dictionary, a vehicle navigation system, a small PC (personal computer), various types of home electric appliances, or the like. The present invention also relates to a method for manufacturing the protection panel.

BACKGROUND ART

A generally available casing of an electronic device such as a mobile phone or a smartphone is configured by combining a front casing and a rear casing that are made of a synthetic resin. Usually fixed onto a surface of the front casing, by fusion bonding or the like, is a protection panel for protecting a liquid crystal display window.

On the other hand, the electronic device such as the mobile phone or the smartphone is sometimes provided with a touch panel that is mounted on a liquid crystal display screen so as to enable touch input operations to the liquid crystal display screen. In this case, the liquid crystal display window of the casing is left open as there cannot be provided a protection panel that inhibits input operations to the touch panel disposed therebelow.

However, Patent Document 1 has recently disclosed a new protection panel that is obtained by adding a touch input function to the protection panel described above. Specifically, as shown in FIG. 12, a protection panel 100 for a display window of an electronic device includes a protection panel main body 107 configured by a transparent plate, a lower electrode sheet 101 that has a quadrilateral lower transparent electrode 102 placed on an upper surface of a transparent resin film and a lower circuit 105b provided at a periphery of the lower transparent electrode 102, and is attached onto an upper surface of the protection panel main body 107, an upper electrode sheet 103 that has a quadrilateral upper transparent electrode 104 disposed on a lower surface of a transparent resin film and an upper circuit 105a provided at a periphery of the upper transparent electrode 104, and is bonded to the lower electrode sheet 101 at peripheral edges thereof with a gap 120 being formed between the electrodes 102 and 104, a decorative sheet 108 that has on at least one of surfaces of a transparent resin film a decorative layer 109 shaping a transparent window portion 108a so as to hide the lower circuit 105b and the upper circuit 105a, and is attached onto an upper surface of the upper electrode sheet 103, and a flexible printed circuit board (FPC) 118 that has an end inserted between the lower electrode sheet 101 and the upper electrode sheet 103 and is connected by thermal compression bonding to output terminals 123 and 124 of the upper circuit 105a and the lower circuit 105b, respectively (refer to FIGS. 12 and 15). The protection panel 100 for a display window of an electronic device is configured to be fitted and retained with no gap in a panel fitting portion 122 of a casing 113 provided with an opening such that an outer surface of the protection panel 100 forms one plane together with a periphery thereof. The protection panel 100 protects a display device 115 that is disposed therebelow so as to be externally visible through the transparent window portion 108a (refer to FIGS. 13 and 14).

The protection panel 100 for a display window of an electronic device is thus configured to allow touch input operations onto a liquid crystal display screen. Furthermore, there is formed in the protection panel no difference in height among the surface of the transparent window portion 108a, the surface of a decorative portion 111 surrounding the transparent window portion 108a, and an outer surface 121 of the casing 113 (refer to FIG. 14). The transparent window portion 108a thus appears integrally with the casing 113 in view of design thereof.

PRIOR ART DOCUMENT

Patent Document

Patent Document 1: Pamphlet of International Publication No. 2005/064451

SUMMARY OF INVENTION

Issues to be Resolved by the Invention

The protection panel main body 107 is configured by a glass plate or a plastic plate, each of which has advantages and disadvantages.

More specifically, the glass plate has the following advantages in comparison to the plastic plate. Firstly, the glass plate has a transmittance higher than that of the plastic plate, so that the liquid crystal display screen is excellently visible through the transparent window portion 108a. Moreover, as the glass plate is less bendable relative to the plastic plate, the protection panel 100 is not brought into contact with the display device 115 upon input operations. As a result, the liquid crystal display screen can be prevented from causing blur or damages. Furthermore, because the glass plate has a surface harder than that of the plastic plate, writing pressures are stabilized upon input operations as if a writing aid board is laid under a notepad, which results in excellent writing feeling with a pen.

On the other hand, the glass plate has the following disadvantages in comparison to the plastic plate. Firstly, it is more difficult to process the outer shape of the glass plate relative to the plastic plate (for example, as shown in FIG. 9, it is extremely difficult to process into a concave round shape). Thus, the panel is restricted in its shape. Moreover, the protection panel main bodies and the respective sheets to be provided thereon cannot be punched at one time out of sheets in large sizes which are preliminarily attached together (the sheets are preliminarily prepared and attached together in sizes large enough to obtain a multiple number or a large number of sets of the protection panel main bodies and the respective sheets thereon). Consequently, fabrication takes long takt time (which is the number of seconds required to fabricate one component). Furthermore, it costs more, in comparison to a plastic plate, to manufacture a glass plate having an irregular profile in a shape other than a quadrilateral shape. On top of this, provision of a hole for a loudspeaker or the like remarkably increases the cost. Fundamentally, a product configured by a glass plate is heavier than that configured by a plastic plate.

In view of the above issues of the conventional arts, the present invention provides a protection panel provided with a touch input function for a display window of an electronic device and a method for manufacturing the protection panel, the protection panel having the advantages of a protection panel main body configured by a glass plate as well as the advantages of a protection panel main body configured by a plastic plate.

Means for Resolving the Issues

A protection panel provided with a touch input function for a display window of an electronic device includes: a protection panel main body configured by a plastic plate having a glass plate fitting opening punched out so as to be larger than a transparent window portion, and a glass plate fitted in the glass plate fitting opening, a lower electrode sheet having a lower transparent electrode in a quadrilateral shape, and a lower circuit arranged at a periphery of the lower transparent electrode, the lower transparent electrode and the lower circuit being provided on an upper surface of a transparent resin film, the lower electrode sheet being attached to an upper surface of the protection panel main body, an upper electrode sheet having an upper transparent electrode in a quadrilateral shape, and an upper circuit arranged at a periphery of the upper transparent electrode, the upper transparent electrode and the upper circuit being provided on a lower surface of the transparent resin film, the upper electrode sheet being bonded to the lower electrode sheet at peripheral edges thereof so as to form a gap between the electrodes, and a decorative sheet having a decorative layer provided on at least one surface of a transparent resin film so as to hide the lower circuit and the upper circuit and form the transparent window portion, the decorative sheet being attached to an upper surface of the upper electrode sheet.

According to a first aspect of the present invention, there is provided a protection panel provided with a touch input function for a display window of an electronic device, the protection panel being fitted and retained with no gap in a panel fitting portion of a casing provided with an opening such that an outer surface thereof forms one plane together with a periphery, and protecting a display device disposed therebelow so as to be externally visible through a transparent window portion, the protection panel comprising:

a protection panel main body including a plastic plate having a glass plate fitting opening punched out so as to be larger than the transparent window portion, and a glass plate fitted in the glass plate fitting opening;

a lower electrode sheet including a transparent resin film for the lower electrode sheet, a lower transparent electrode in a quadrilateral shape, and a lower circuit surrounding the lower transparent electrode, the lower transparent electrode and the lower circuit being provided on an upper surface of the transparent resin film for the lower electrode sheet, the lower electrode sheet being attached to an upper surface of the protection panel main body;

an upper electrode sheet including a transparent resin film for the upper electrode sheet, an upper transparent electrode in a quadrilateral shape, and an upper circuit surrounding the upper transparent electrode, the upper transparent electrode and the upper circuit being provided on a lower surface of the transparent resin film for the upper electrode sheet, the upper electrode sheet being bonded to the lower electrode sheet at peripheral edges thereof so as to form a gap between the lower transparent electrode and the upper transparent electrode; and a decorative sheet including a transparent resin film for the decorative sheet, and a decorative layer that is provided on at least one surface of the transparent resin film for the decorative sheet so as to hide the lower circuit and the upper circuit and form the transparent window portion, the decorative sheet being attached to an upper surface of the upper electrode sheet.

According to a second aspect of the present invention, there is provided the protection panel provided with a touch input function for a display window of an electronic device according to the first aspect, further comprising:

an FPC connected with respective output terminals of the lower circuit and the upper circuit.

According to a third aspect of the present invention, there is provided the protection panel provided with a touch input function for a display window of an electronic device according to the first or second aspect, wherein the plastic plate has through holes.

According to a fourth aspect of the present invention, there is provided a method for manufacturing a protection panel for a display window of an electronic device, the protection panel being fitted and retained with no gap in a panel fitting portion of a casing provided with an opening such that an outer surface thereof forms one plane together with a periphery, and protecting a display device disposed therebelow so as to be externally visible through a transparent window portion, the method comprising:

forming a collective protection panel main body including a plastic plate having a plurality of glass plate fitting openings punched out so as to be larger than the transparent window portion, and glass plates respectively fitted in the glass plate fitting openings;

forming a collective lower electrode sheet including a plurality of lower transparent electrodes in a quadrilateral shape, and a plurality of lower circuits arranged respectively at peripheries of the lower transparent electrodes, the lower transparent electrodes and the lower circuits being provided on an upper surface of a transparent resin film for the collective lower electrode sheet;

forming a collective upper electrode sheet including a plurality of upper transparent electrodes in a quadrilateral shape, and a plurality of upper circuits arranged respectively at peripheries of the upper transparent electrodes, the upper transparent electrodes and the upper circuits being provided on a lower surface of a transparent resin film for the collective upper electrode sheet;

forming a collective decorative sheet including decorative layers provided on at least one surface of a transparent resin film for the collective decorative sheet so as to hide the lower circuits and the upper circuits and form the plurality of transparent window portions; and attaching the collective lower electrode sheet on an upper surface of the collective protection panel main body, attaching the collective upper electrode sheet to the collective lower electrode sheet such that air spaces are provided between the electrodes, and attaching the collective decorative sheet on an upper surface of the collective upper electrode sheet to obtain a laminated body.

Effects of the Invention

According to the present invention, the protection panel provided with a touch input function for a display window of an electronic device adopts the protection panel main body configured by the plastic plate that is provided with the glass plate fitting opening larger than the transparent window portion as well as by the glass plate that is fitted in the glass plate fitting opening. Therefore, the protection panel of the present invention exerts the following effects.

In the protection panel provided with a touch input function according to the present invention, the protection panel main body is configured such that the glass plate is fitted in the glass plate fitting opening in the plastic plate. Thus, the liquid crystal display screen is excellently visible as in the case where the entire protection panel main body is configured only by a glass plate. Further, in the protection panel provided with a touch input function according to the present invention, since the protection panel main body is configured such that the glass plate is fitted in the glass plate fitting opening in the plastic plate, as in the case where the entire protection panel main body is configured only by a glass plate, the protection panel main body is less bendable and is not brought into contact with a display device upon input operations. As a result, the liquid crystal display screen can be prevented from causing blur or damages. Moreover, in the protection panel provided with a touch input function according to the present invention, since the protection panel main body is configured such that the glass plate is fitted in the glass plate fitting opening in the plastic plate, as in the case where the entire protection panel main body is configured only by a glass plate, writing pressures are stabilized upon input operations, which results in excellent writing feeling with a pen.

Furthermore, in the protection panel provided with a touch input function according to the present invention, the protection panel main body is configured such that the glass plate is surrounded by the plastic plate. Accordingly, the protection panel according to the present invention also exerts effects which cannot be obtained in the case where the entire protection panel main body is configured only by a glass plate. More specifically, as the outer shape of the protection panel main body is configured by the plastic plate, the outer shape is easily processed. In addition, the protection panel main body is not restricted in its shape. Further, in the protection panel provided with a touch input function according to the present invention, as the protection panel main body is configured such that the glass plate is surrounded by the plastic plate, the protection panel main bodies and the respective sheets to be provided thereon can be punched at one time out of sheets in large sizes which are preliminarily attached together (the sheets are preliminarily prepared and attached together in sizes large enough to obtain a multiple number or a large number of sets of the protection panel main bodies and the respective sheets thereon). As a result, fabrication takes short takt time. Moreover, in the protection panel provided with a touch input function according to the present invention, as the protection panel main body is configured such that the glass plate is surrounded by the plastic plate, a quadrilateral glass plate can be always adopted regardless of the shape of the protection panel main body. As a result, the manufacturing cost is kept low. Even in a case where a hole for a loudspeaker is punched out, such a hole can be provided in the plastic plate with no increase in cost therefor. Fundamentally, as the protection panel main body is configured by the plastic plate and the glass plate combined together, the product is reduced in weight in comparison to a product including the protection panel main body entire of which is configured only by a glass plate.

BRIEF DESCRIPTION OF THE DRAWINGS

These and other aspects and features of the present invention will become clear from the following description taken in conjunction with the preferred embodiments thereof with reference to the accompanying drawings, in which.

DESCRIPTION OF EMBODIMENTS

Figure 1:
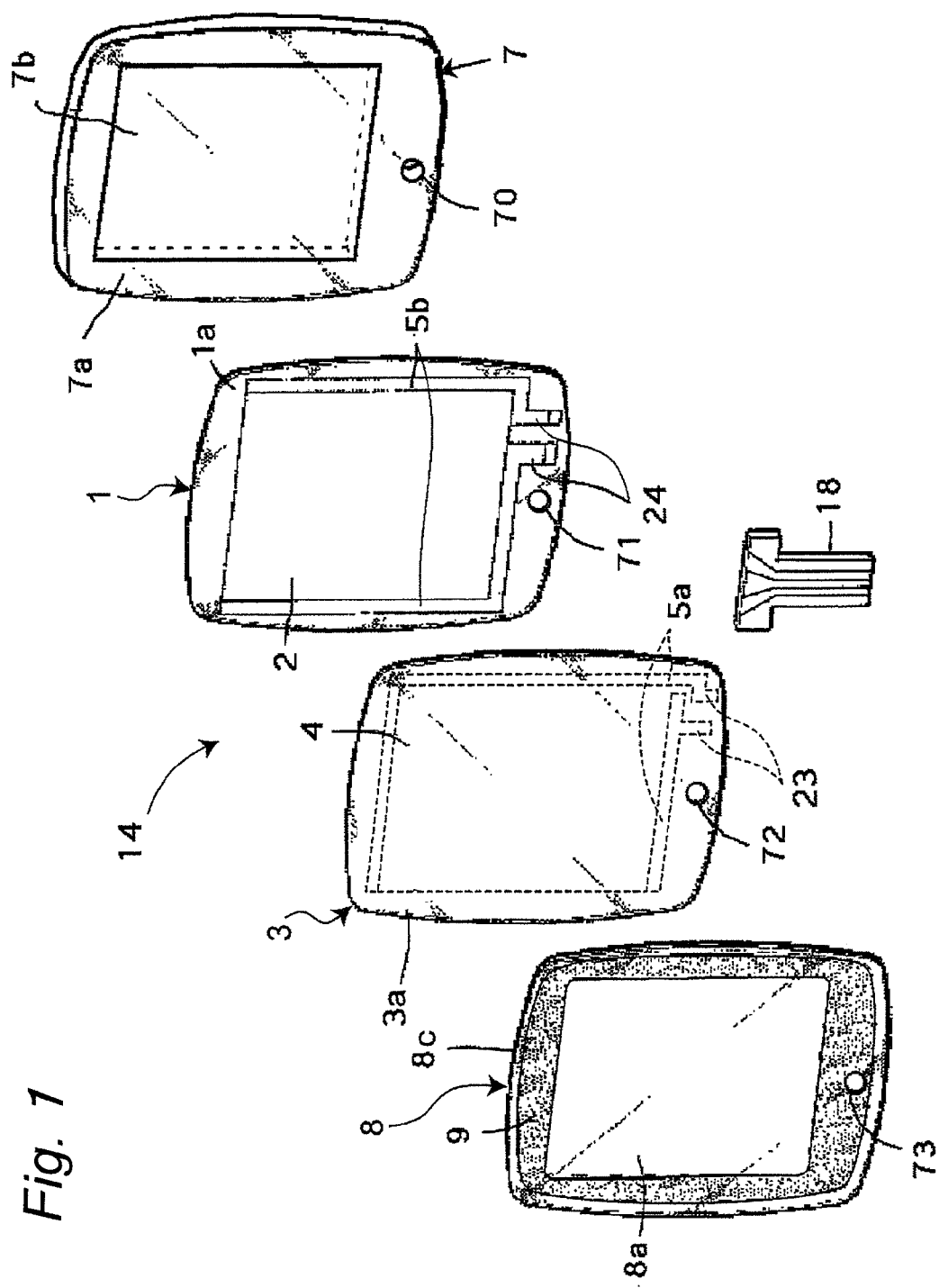
FIG. 1 is an exploded view of a protection panel provided with a touch input function for a display window of an electronic device according to a first embodiment of the present invention.

Before the description of the present invention proceeds, it is to be noted that like parts are designated by like reference numerals throughout the accompanying drawings.

Prior to further description of the present invention, it is noted that, in the accompanying drawings, the same components are denoted by an identical symbol.

Figure 2A:
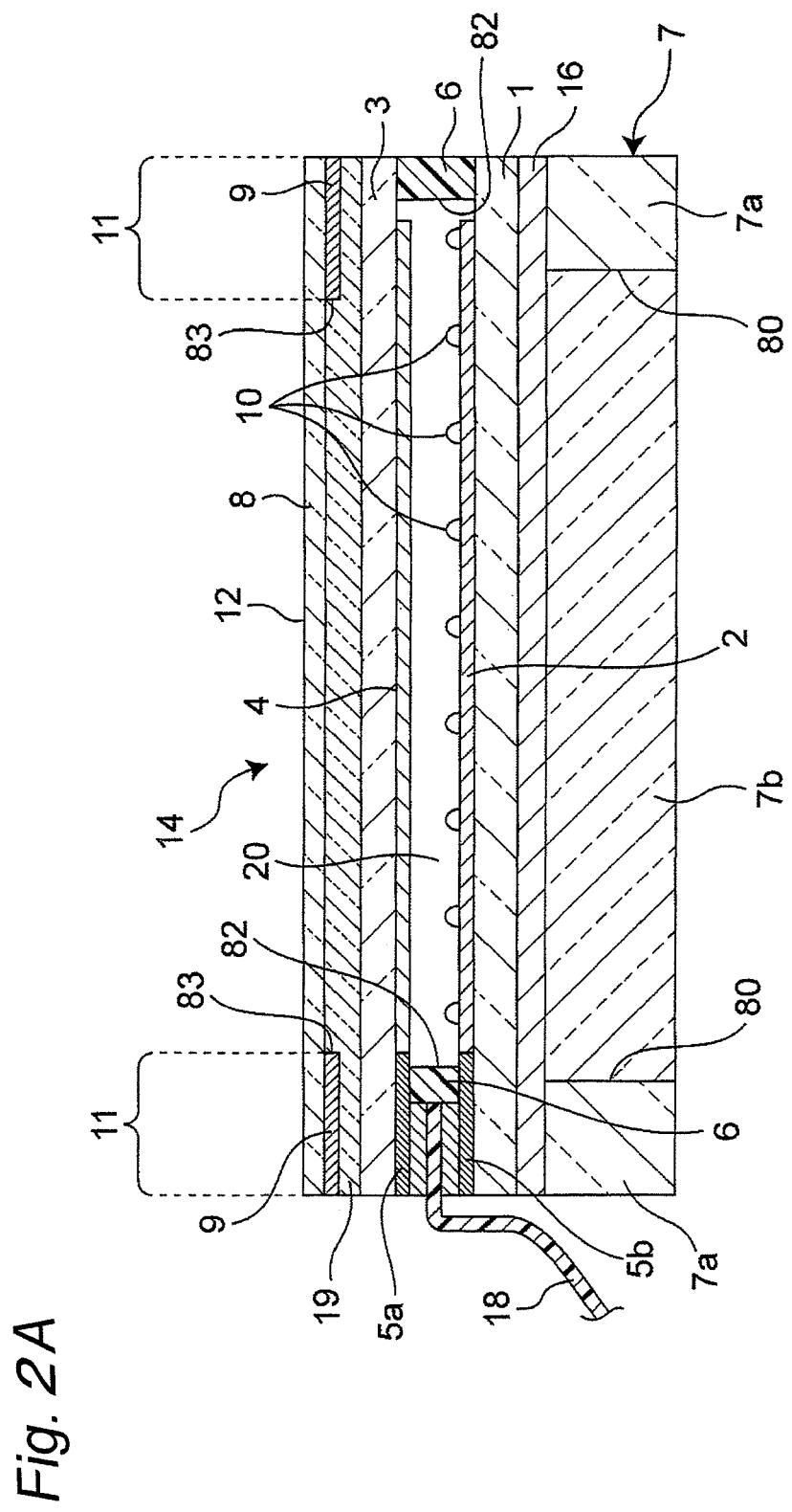
FIG. 2A is a cross sectional view of the protection panel shown in FIG. 1.
Figure 2B:
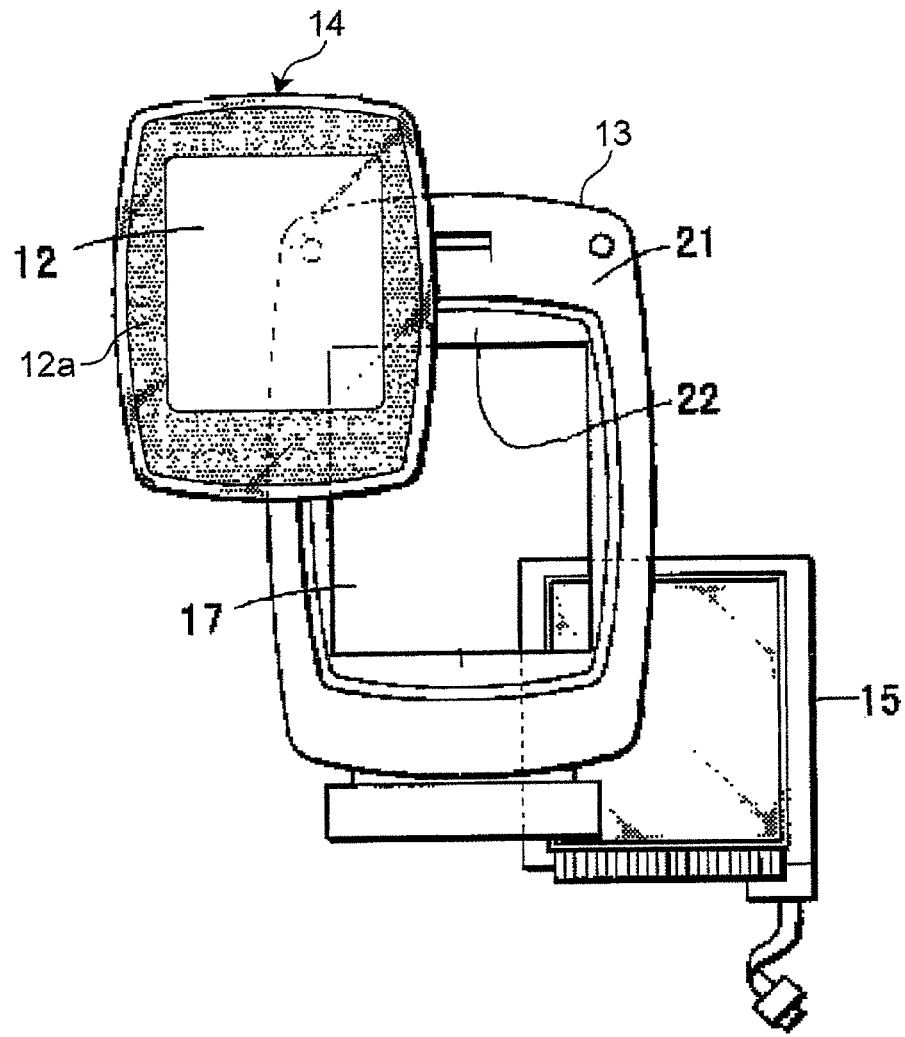
FIG. 2B is an exploded view of an example of a mount structure in a casing with use of the protection panel shown in FIG. 1.
Figure 2C:
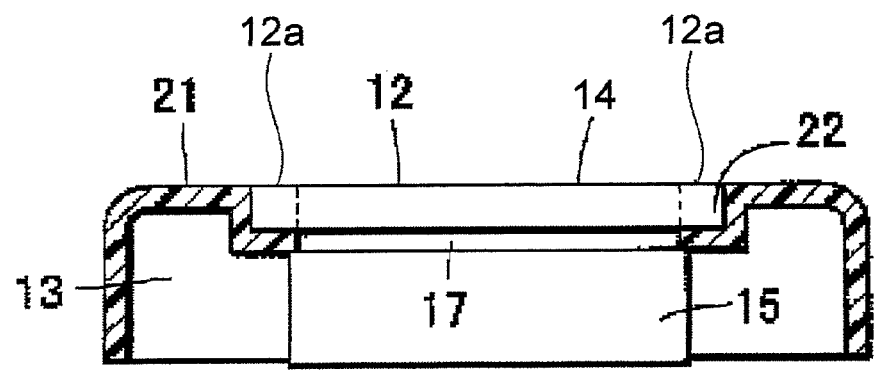
FIG. 2C is a cross sectional view of the exemplary mount structure in the casing of FIG. 2B.

Described in detail below with reference to the drawings is a first embodiment of the present invention. FIG. 1 is an exploded view of a protection panel 14 provided with a touch input function for a display window of an electronic device according to the first embodiment of the present invention. FIG. 2A is a cross sectional view of the protection panel 14 shown in FIG. 1. FIG. 2B is an exploded view of an example of a mount structure in a casing with use of the protection panel shown in FIG. 1. FIG. 2C is a cross sectional view of the example of the mount structure in the casing of FIG. 2B.

As shown in FIGS. 1 and 2A to 2C, the protection panel 14 provided with a touch input function for a display window of an electronic device according to the first embodiment, is configured to be fitted and retained with no gap in a panel fitting portion 22 of a casing 13 that has an opening 17, such that an outer surface of the protection panel forms one plane together with a periphery thereof. The protection panel protects a display device 15 disposed therebelow so as to be externally visible through a transparent window portion 8a that defines a visible region VR. The visible region VR of the protection panel 14 is defined directly by the transparent window portion 8a. More precisely, the visible region VR is a region in which a liquid crystal display screen of the display device 15 is visible through the transparent window portion 8a and a glass plate 7b fitted in a glass plate fitting opening 7d to be described later.

This protection panel 14, which is provided with a touch input function for a display window of an electronic device, includes a protection panel main body 7, a lower electrode sheet 1, an upper electrode sheet 3, and a decorative sheet 8. The lower electrode sheet 1 has, on an upper surface of a lower electrode sheet transparent resin film 1a, a quadrilateral lower transparent electrode 2 and a lower circuit 5b provided at a periphery of the lower transparent electrode 2, and is attached onto an upper surface of the protection panel main body 7. The upper electrode sheet 3 has, on a lower surface of an upper electrode sheet transparent resin film 3a, a quadrilateral upper transparent electrode 4 and an upper circuit 5a provided at a periphery of the upper transparent electrode 4, and is bonded with the lower electrode sheet 1 at peripheral edge portions thereof with a gap 20 being formed between the transparent electrodes 2 and 4. The decorative sheet 8 has, on at least one of surfaces of a decorative sheet transparent resin film 8c, a decorative layer 9 forming the transparent window portion 8a so as to hide the lower circuit 5b and the upper circuit 5a, and is attached onto an upper surface of the upper electrode sheet 3.

With the protection panel 14 provided with a touch input function thus configured, when a surface of the decorative sheet 8 is pressed with a finger, a pen, or the like, the upper electrode sheet 3 and the decorative sheet 8 are integrally bent downward in FIG. 2A. As a result, the electrodes 2 and 4, which are respectively formed on surfaces facing each other of the upper electrode sheet 3 and the lower electrode sheet 1, are brought into contact with each other, so that an input position is detected.

The transparent plate used in the protection panel main body 7 is made of a material that is excellent in transparency and is capable of protecting from damages the display device 15 such as a liquid crystal panel or an organic EL panel. The first embodiment of the present invention is characterized in that the protection panel main body 7 is configured by a plastic plate 7a having such a quadrilateral frame shape that a glass plate fitting opening (visible region forming opening) 7d is punched out to be entirely larger (larger both in the longitudinal direction and the lateral direction) than the transparent window portion 8a, and the glass plate 7b having a quadrilateral plate shape to be fitted and fixed in the glass plate fitting opening 7d punched out in the plastic plate 7a. It is preferable to define the size of the glass plate fitting opening 7d, which is punched out as described above, so as to be slightly larger than the size of the transparent window portion 8a with respect to the longitudinal dimension and the lateral dimension, in view of a variation in size upon attachment with the decorative sheet 8. It is preferable to define the size of the glass plate 7b so as to be further slightly smaller than the size of the glass plate fitting opening 7d, which is punched out as described above, with respect to the longitudinal dimension and the lateral dimension, in view of a variation in size upon cutting the glass plate 7b or a variation in size upon punching out the plastic plate 7a.

The plastic plate 7a can be made of, for example, a general resin such as polystyrene series resin, polyolefin series resin, ABS resin, AS resin, acrylic series resin, or AN resin. Furthermore, the material for the plastic plate 7a may be a general engineering resin such as polyphenylene oxide polystyrene series resin, polycarbonate series resin, polyacetal series resin, polycarbonate modified polyphenylene ether resin, polybutylene terephthalate resin, or ultrahigh molecular weight polyethylene resin; or a super engineering resin such as polysulfone resin, polyphenylene sulfide series resin, polyphenylene oxide series resin, polyarylate resin, polyetherimide resin, polyimide resin, liquid crystalline polyester resin, or polyallyl series high-temperature resin.

Figure 9:
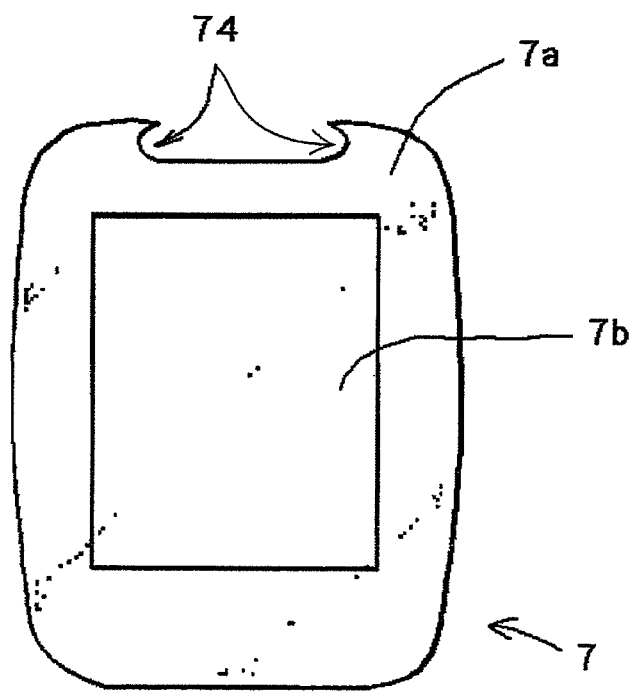
FIG. 9 is a plan view of an example of an outer shape of the protection panel provided with a touch input function for a display window of an electronic device according to the first embodiment of the present invention.

The protection panel main body 7 is configured such that the plastic plate 7a is made of the material described above and surrounds the glass plate 7b. Accordingly, upon processing the outer shape of the protection panel main body 7, the outer shape not of the glass plate 7b but of the plastic plate 7a may be processed, of which work is easily performed. In addition, the outer shape of the plastic plate is not restricted as in the case of the glass plate. For example, it is possible to process the plastic plate 7a to have an outer shape in a concave round shape as shown in FIG. 9 (a curved portion denoted by symbol 74 in FIG. 9). Further, the protection panel main bodies 7 and the respective sheets to be provided thereon can be punched at one time out of sheets in collective (large) sizes which are preliminarily attached together (the sheets are preliminarily prepared and attached together in sizes large enough to obtain a large number of sets). As a result, such fabrication takes short takt time.

Also in a case where the protection panel 14 is provided with through holes 70 to 73 (see FIG. 1), which are used for a mechanical switch, a loudspeaker, a camera, or the like, such holes may be formed not in the glass plate but in the plastic plate 7a. In this manner, forming holes in the plastic plate 7a costs less than forming holes in the glass plate.

Further, as the protection panel main body 7 is configured by the plastic plate 7a and the glass plate 7b combined together, the product is reduced in weight in comparison to a product including a protection panel main body 7 entire surface of which is configured only by a glass plate.

The glass plate 7b fitted in the glass plate fitting opening 7d, which is punched out in the plastic plate 7a, can be made of a material such as soda glass, borosilicate glass, or tempered glass. The glass plate 7b is preferably 0.4 to 1.2 mm thick, for example. The glass plate 7b of less than 0.4 mm thick is easily bendable, while the glass plate 7b of more than 1.2 mm thick is too heavy.

Figure 16:
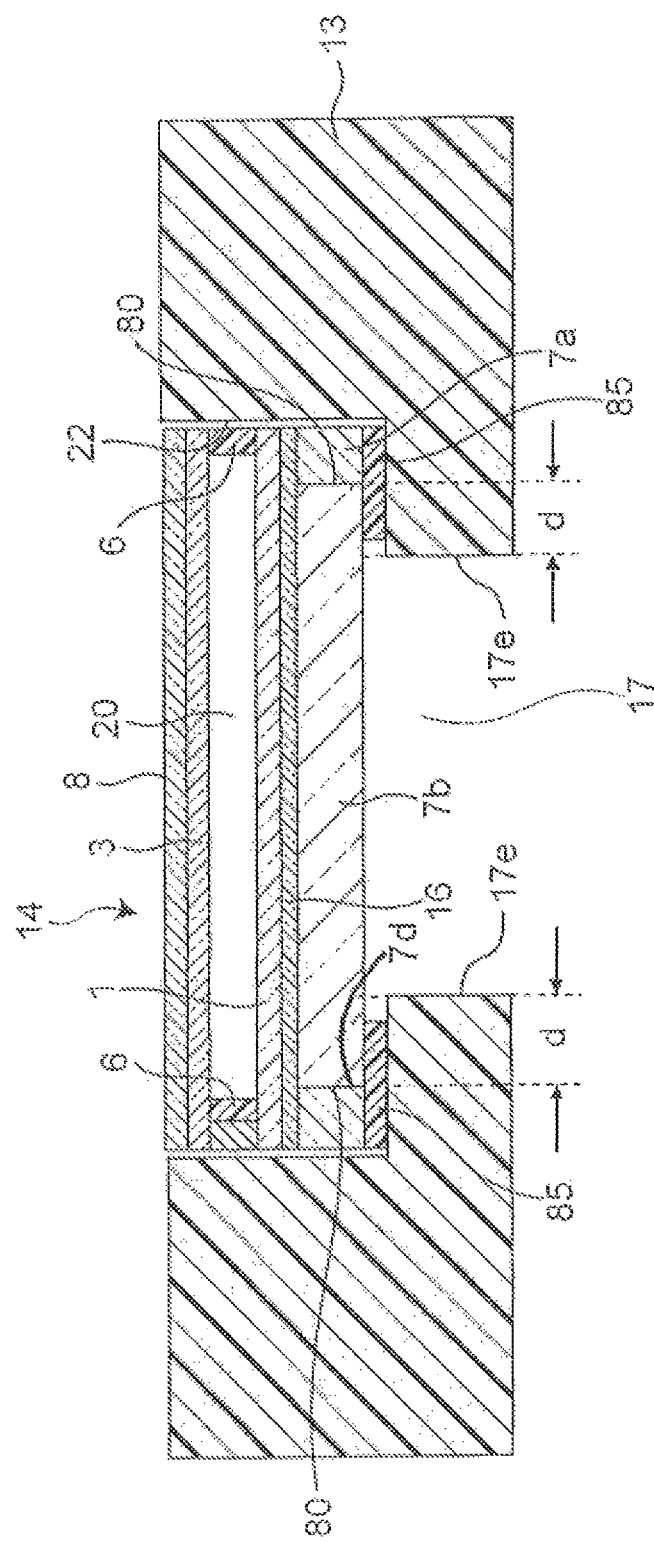
FIG. 16 is a schematic cross sectional view illustrating a positional relation of a boundary between a glass plate and a plastic plate with respect to an end edge of a boundary opening in a panel fitting portion in the casing, in a case where the protection panel provided with a touch input function for a display window of an electronic device according to the first embodiment of the present invention is fixed to the panel fitting portion of the casing with use of a double-sided tape (a decorative layer and the like not being shown)

As shown in FIG. 16, when the protection panel 14 is fixed to the panel fitting portion 22 of the casing 13 with use of a double-sided tape 85, the glass plate 7b is disposed such that respective end edges thereof (a boundary 80 between the glass plate 7b and the plastic plate 7a) are fixed to the panel fitting portion 22 at least by 1 mm wide. In other words, both the glass plate 7b and the plastic plate 7a are disposed so as to be supported at the boundary 80 therebetween by the panel fitting portion 22 of the casing 13. More specifically, the boundary 80 is located on the panel fitting portion 22 and outside a boundary opening 17 of the panel fitting portion 22. The boundary 80 between the glass plate 7b and the plastic plate 7a is located outside an end edge 17e of the boundary opening 17 in the panel fitting portion 22, and a dimension d indicating the distance therebetween has an upper limit value of 5 mm. If the dimension d exceeds this upper limit value, the distance is too large between the display screen visible through the opening 17 and the outer shape of the protection panel 14. In this case, it is difficult to apply a narrow frame, and the decorative layer 9 needs to be increased in width thereof. The dimension d indicating the distance from the end edge 17e of the boundary opening 17 in the panel fitting portion 22 to the boundary 80 between the glass plate 7b and the plastic plate 7a, located outside the end edge 17e, has a lower limit value of 1 mm. If the dimension d is smaller than this lower limit value, it is difficult to securely support the glass plate 7b by the casing 13. For example, in a case where the glass plate 7b is not at all supported by the casing 13, the glass plate 7b may fall out of the plastic plate 7a after repeated input operations.

Since the glass plate 7b is fitted in the glass plate fitting opening 7d, the visible region VR corresponding to the transparent window portion 8a, which is smaller than the glass plate fitting opening 7d, is entirely occupied by the glass plate 7b. As a result, similarly to the case where the entire surface of the protection panel main body 7 is configured only by the glass plate, the liquid crystal display screen has excellent visibility. Further, as the glass plate 7b is less bendable relative to the plastic plate, the glass plate 7b is not brought into contact with the display device 15 upon input operations, thereby preventing blur or damages in the liquid crystal display screen. Moreover, the glass plate 7b has the surface harder than that of the plastic plate, so that writing pressures are stabilized upon input operations as if a writing aid board is laid under a notepad, which results in excellent writing feeling with a pen.

The protection panel main body 7 is configured such that the plastic plate 7a surrounds the glass plate. Accordingly, the plastic plate 7a has only to be processed such that the outer shape thereof is matched with the outer shape of the protection panel main body 7, while it is unnecessary to process the glass plate 7b. Therefore, it is possible to adopt the quadrilateral glass plate 7b regardless of the shape of the protection panel main body 7. The outer shape of the glass plate 7b may be processed by cutting linearly and obliquely, cutting into an irregular shape such as a curved shape or a round shape, or cutting in a part of the glass plate. Any one of the above processing is remarkably expensive in comparison to cutting into a quadrilateral shape. In the first embodiment of the present invention, the quadrilateral glass plate 7b can be always adopted regardless of the shape of the protection panel main body 7, so that the manufacturing cost for the protection panel main body 7 is kept low.

Further, the glass plate 7b having been simply cut (just cut with no additional treatment) has a cut surface that is sharp and dangerous enough to hurt a hand. The cut surface has an end edge not in a linear shape and thus not with fine appearance. Accordingly, in the case where the entire surface of the protection panel main body is configured only by the glass plate as in the conventional case, the protection panel main body of a finished product has an end surface with the glass plate being exposed. It is thus necessary to process the cut surface by chamfering with use of a grinder or a special machine, polishing, or the like, which also increases the cost. However, in the first embodiment of the present invention, the protection panel main body 7 is configured such that the plastic plate 7a surrounds the glass plate 7b. Accordingly, the outer surface of the plastic plate 7a can be easily molded into a smooth and safe shape in accordance with the shape of a cavity in a mold or the like. As a result, the cut surface of the glass plate 7b needs not to be processed after molding.

Furthermore, the glass plate 7b is not exposed in the protection panel main body 7, which is configured such that the plastic plate 7a surrounds the glass plate. Therefore, the protection panel 14 is durable against an impact applied to an end surface thereof. More specifically, against the impact applied to the end surface of the protection panel 14, the plastic plate 7a around the glass plate 7b serves as a buffer for the glass plate 7b, thereby preventing damages to the glass plate 7b.

In other words, in a case where the glass plate 5b is broken, glass pieces scatter only toward the rear surface (toward the display device) in the thickness direction of the glass plate 5b, but do not scatter in the direction perpendicular to the thickness direction of the glass plate 5b. Therefore, the protection panel 14 is safer to a worker during handling or assembling thereof.

Figure 17A:
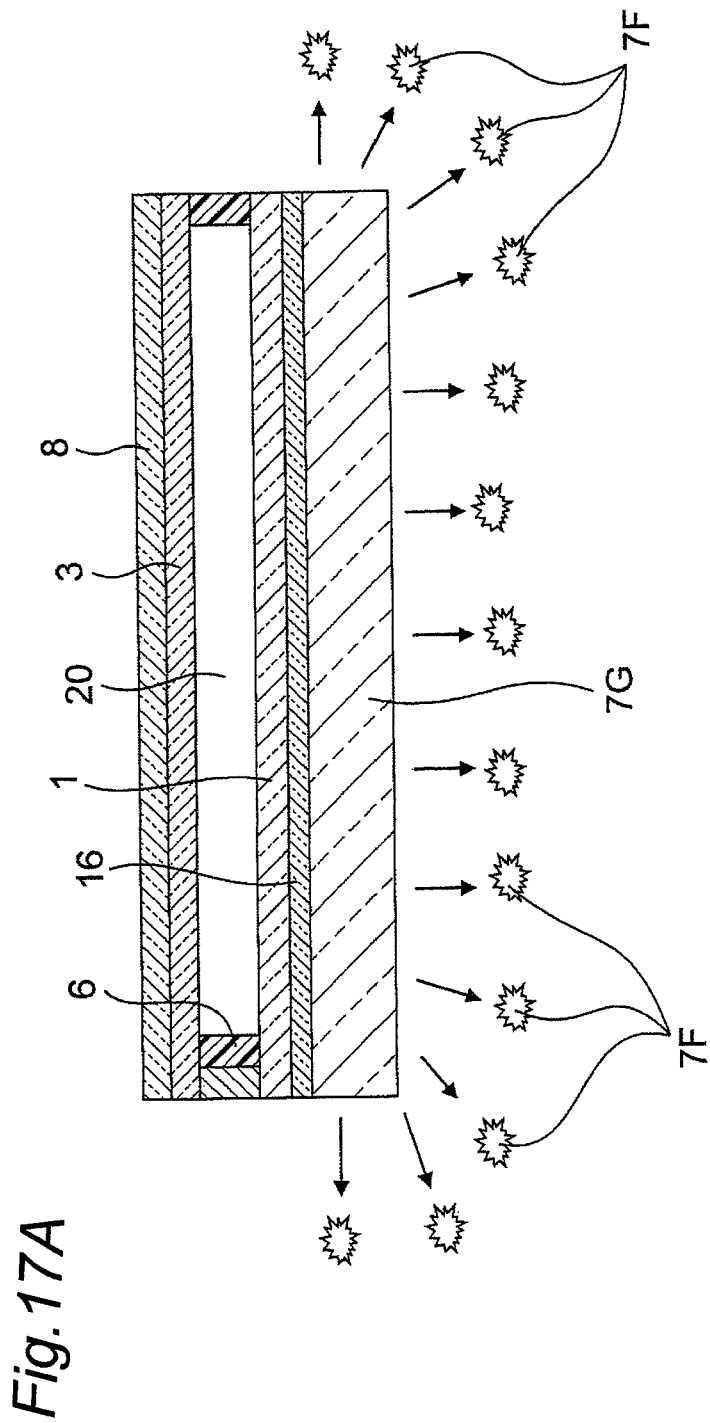
FIG. 17A is a schematic cross sectional view illustrating for comparison that, in a case where an entire protection panel main body is configured only by a glass plate and the glass plate is broken, glass pieces scatter downward in the thickness direction of the glass plate as well as laterally in a direction perpendicular to the thickness direction.

FIG. 17A shows, for comparison, the case where the entire protection panel main body is configured only by the glass plate. In the case shown in FIG. 17A, when a glass plate 7G is broken, glass pieces 7F scatter downward in the thickness direction of the glass plate 7G as well as laterally in the direction perpendicular to the thickness direction.

Figure 17B:
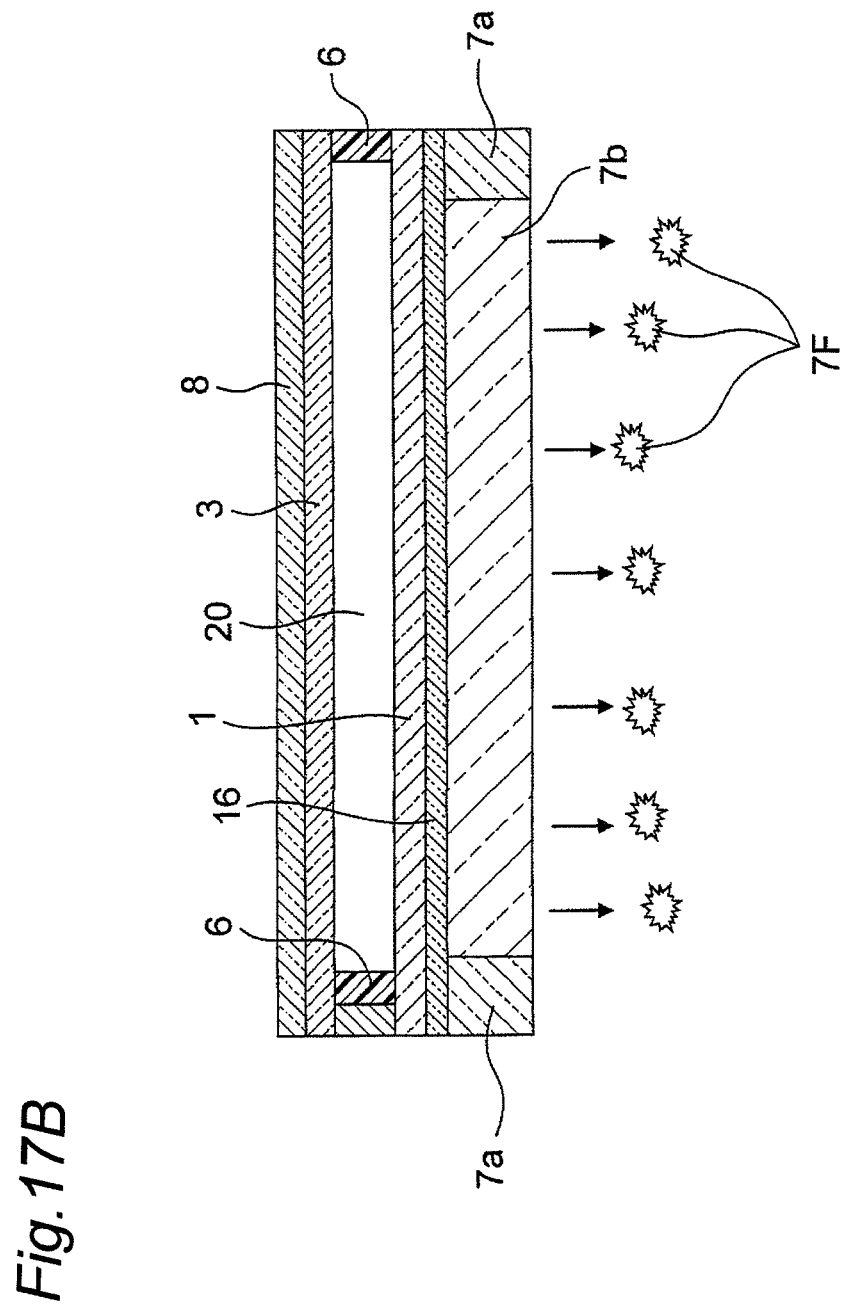
FIG. 17B is a schematic cross sectional view illustrating that, in a case where the glass plate is broken in the protection panel provided with a touch input function for a display window of an electronic device according to the first embodiment of the present invention, the plastic plate in a frame shape can prevent glass pieces from scattering laterally with respect to the glass plate.

To the contrary, according to the first embodiment, as shown in FIG. 17B, the protection panel main body 7, the glass plate 7b is disposed to surround the plastic plate. Thus, in a case where the glass plate 7b is broken, the plastic plate 7a in the frame shape prevents glass pieces 7F from scattering laterally with respect to the glass plate 7b. In other words, the plastic plate 7a in the frame shape serves as a resin protection frame. In order to securely obtain this function, the plastic plate 7a in the frame shape is preferably thicker than the glass plate 7b by approximately +0.1 mm, for example. More particularly, in order that the plastic plate 7a functions as the resin protection frame, the difference in thickness between the plastic plate 7a and the glass plate 7b may be between +0.5 mm to −0.25 mm. The difference in thickness has an upper limit value of +0.5 mm, so that the plastic plate 7a is made thicker than the glass plate 7b by 0.5 mm or less at a maximum. If the difference in thickness exceeds this upper limit value, the protection panel main body 7 becomes too thick. The lower limit value of the difference in thickness is −0.25 mm, in which case the plastic plate 7a is made thinner than the glass plate 7b by 0.25 mm. If the plastic plate is thinner than the lower limit value, there will be obtained substantially no effect of preventing the glass plate 7b from scattering.

Each of the transparent resin films 1a and 3a respectively configuring the lower electrode sheet 1 and the upper electrode sheet 3 may be made of engineering plastic of polycarbonate series, polyamide series, polyether ketone series, or the like; or a resin film of acrylic series, polyethylene terephthalate series, polybutylene terephthalate series, or the like.

The lower transparent electrode 2 and the upper transparent electrode 4 are each configured by a transparent conductive film. Examples of the material for the transparent conductive film include a metal oxide such as tin oxide, indium oxide, antimony oxide, zinc oxide, cadmium oxide, or ITO; and a metal such as gold, silver, copper, tin, nickel, aluminum, or palladium; as well as a thin film of a conductive polymer. In order to fabricate each of the lower transparent electrode 2 and the upper transparent electrode 4, there is formed a conductive coating sheet on an entire surface of each of the transparent resin films 1a and 3a, which are respectively used to configure the lower transparent electrode 2 and the upper transparent electrode 4, by vacuum vapor deposition, sputtering, ion plating, CVD (chemical vapor deposition), roll coating, or the like, and then unnecessary portions of the conductive coating sheet is removed by etching. In performing etching, after forming, on a portion to be left as the electrode, a resist by photolithography, screening, or the like, the remaining portion of the conductive coating sheet provided with no resist is removed by being immersed in or by spraying an etching solution such as hydrochloric acid, and then the resist is removed by being immersed in a solvent so as to be swollen or dissolved. Alternatively, the conductive coating sheet can be etched with use of laser.

The lower circuit 5b and the upper circuit 5a are each formed in a predetermined pattern such as a bus bar or a routing wire. The lower circuit 5b and the upper circuit 5a are each made of a metal such as gold, silver, copper, or nickel; or a conductive paste of carbon or the like. As these forming method, there are printing such as screen printing, offset printing, gravure printing, or flexography, photoresist processing; brush coating; or the like. The lower circuit 5b and the upper circuit 5a can be fabricated with no consideration of narrowing the frame as in a touch panel. Because the protection panel provided with a touch input function according to the present first embodiment is disposed integrally with the front casing 13 that has a liquid crystal display window of an electronic device such as a mobile phone, and is not restricted by the size of the display device 15.

In order to bond the peripheral edge portions of the lower electrode sheet 1 and the upper electrode sheet 3 to each other such that the gap 20 is formed between the lower transparent electrode 2 and the upper transparent electrode 4, used is a double-sided adhesive tape 6 punched into a frame shape correspondingly to the peripheral edge portions, or an insulative transparent adhesive agent that is made of acrylic resin, epoxy resin, phenol resin, vinyl resin, or the like and is placed in a frame shape correspondingly to the peripheral edge portions. The transparent adhesive agent may be applied by ordinary printing such as screen printing, offset printing, gravure printing, or flexography. In a case where the end of the FPC 18 is subsequently inserted between the lower electrode sheet 1 and the upper electrode sheet 3, the lower electrode sheet 1 and the upper electrode sheet 3 are bonded together except for a region not being bonded so as to allow the end of the FPC to be inserted thereinto.

There are provided a large number of minute spacers 10 between the lower electrode sheet 1 and the upper electrode sheet 3, so that the transparent electrodes 2 and 4, which are respectively provided on the surfaces facing each other, are not accidentally brought into contact with each other. The spacers 10 can be each provided by forming transparent light curing resin into a minute dot shape by photo processing. Alternatively, the spacers 10 can be provided by forming a large number of minute dots by printing.

The transparent resin cover film 8c configuring the decorative sheet 8 may be made of, for example, engineering plastic of polycarbonate series, polyamide series, polyether ketone series, or the like; a resin film of acrylic series, polyethylene terephthalate series, polybutylene terephthalate series; or the like.

The decorative sheet 8 is configured by the transparent resin cover film 8c that is provided on at least one of the surfaces thereof with the decorative layer 9 having the transparent window portion 8a. The decorative sheet is attached onto the upper surface of the upper electrode sheet 3. As already described, since the lower electrode sheet 1 and the upper electrode sheet 3 are provided respectively with the opaque circuits 5b and 5a, the decorative sheet 8 is disposed so that these circuits are covered and hidden with the decorative layer 9. The portion covered with the decorative layer 9 configures a decorative portion 11, while the transparent window portion 8a is configured by the remaining portion not covered with the decorative layer 9. As an example, the decorative portion 11 has a quadrilateral frame shape, while the transparent window portion 8a has a quadrilateral shape.

Figure 18A:
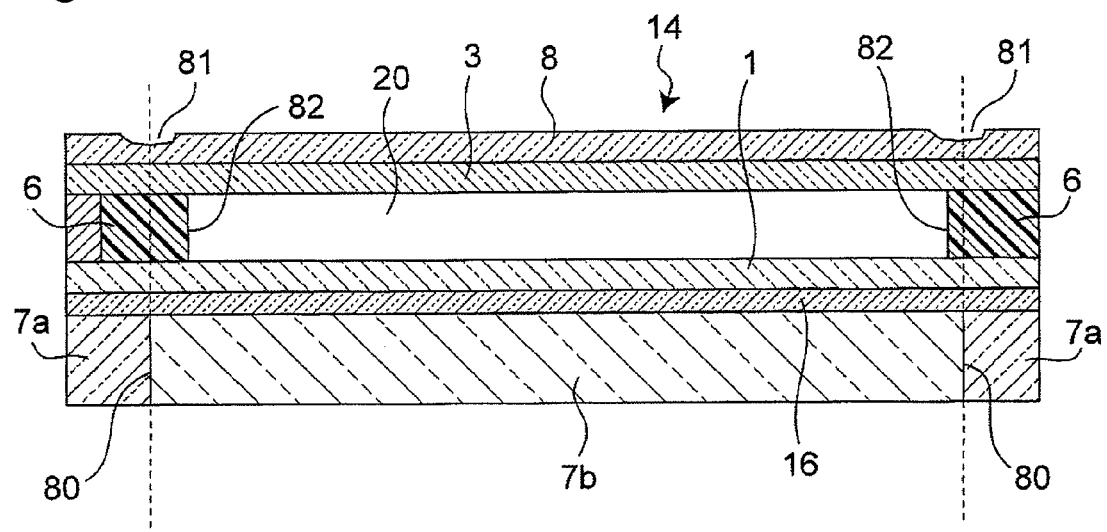
FIG. 18A is a schematic cross sectional view illustrating that, in a case where the boundary between the glass plate and the plastic plate is located outside an inner end edge of a double-sided adhesive tape, which has a frame shape and attaches an upper electrode sheet and a lower electrode sheet with each other, the boundary between the glass plate and the plastic plate is externally visible easily through the double-sided adhesive tape in the frame shape.
Figure 18B:
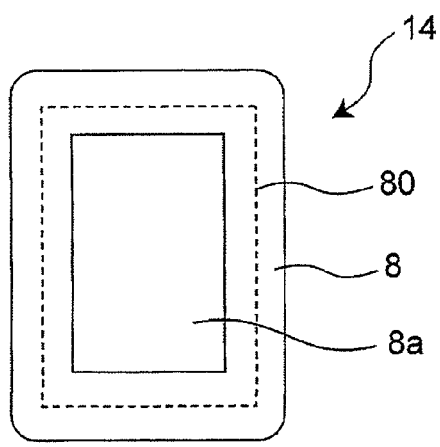
FIG. 18B is a plan view of the protection panel of FIG. 18A.

The boundary (interface) 80 between the glass plate 7b and the plastic plate 7a is located outside an inner edge 83 of the decorative layer 9 as well as inside an inner edge end 82 of the double-sided adhesive tape 6 in the frame shape. The boundary (interface) 80 between the glass plate 7b and the plastic plate 7a is located outside the inner edge 83 of the decorative layer 9 so that the boundary is hidden by the decorative layer 9. If the boundary 80 between the glass plate 7b and the plastic plate 7a is located outside the inner edge 82 of the double-sided adhesive tape 6 in the frame shape, the boundary 80 between the glass plate 7b and the plastic plate 7a will be externally visible through the double-sided adhesive tape 6 in the frame shape. More specifically, shown in FIGS. 18A and 18B are the case where the boundary 80 between the glass plate 7b and the plastic plate 7a is located outside the inner edge 82 of the double-sided adhesive tape 6 in the frame shape, which attaches the upper electrode sheet 3 with the lower electrode sheet 1.

In this case, if the lower electrode sheet 1 and the protection panel main body 7 are entirely attached with each other, a difference in height caused by the boundary 80 affects the double-sided adhesive tape 6 in the frame shape, the upper electrode sheet 3, and the decorative sheet 8 attached entirely thereonto. As a result, the uppermost surface of the protection panel 14 is also concaved, which portion will be visible as a dent 81 from outside the protection panel 14.

Figure 19A:
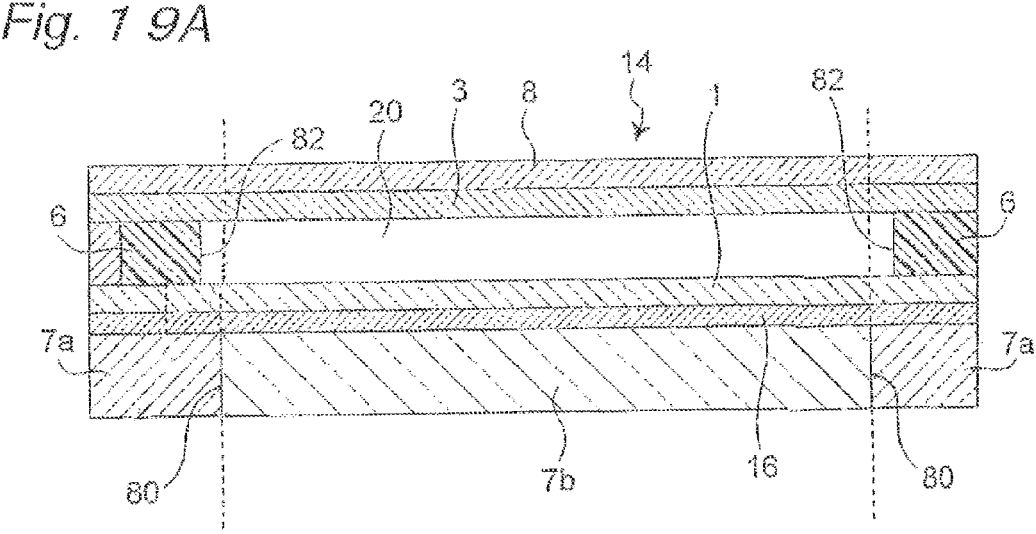
FIG. 19A is a schematic cross sectional view illustrating that, in the protection panel provided with a touch input function for a display window of an electronic device according to the first embodiment of the present invention, in a case where the boundary between the glass plate and the plastic plate is located inside the inner end edge of the double-sided adhesive tape in the frame shape, the boundary or a dent at the boundary is not significantly visible.
Figure 19B:
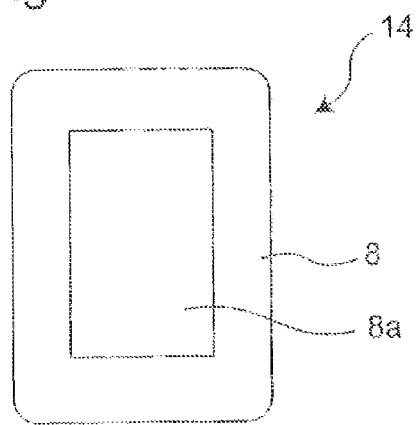
FIG. 19B is a plan view of the protection panel of FIG. 19A.

To the contrary, shown in FIGS. 19A and 19B are the case where the boundary 80 between the glass plate 7b and the plastic plate 7a is located inside the inner edge end 82 of the double-sided adhesive tape 6 in the frame shape.

In this case, because of the presence of an air layer in the gap 20 between the upper electrode sheet 3 and the lower electrode sheet 1, the difference in height due to the boundary 80 between the glass plate 7b and the plastic plate 7a does not affect any of the upper electrode sheet 3 and the decorative sheet 8 attached entirely thereonto. More specifically, in the case where the boundary 80 between the glass plate 7b and the plastic plate 7a is located inside the inner edge 82 of the double-sided adhesive tape 6 in the frame shape, the boundary 80 between the glass plate 7b and the plastic plate 7a is seen from outside the protection panel 14 via the air layer in the gap 20 that is located inside the inner edge 82 of the double-sided adhesive tape 6 in the frame shape. Therefore, the boundary 80 or the dent 81 at the boundary 80 is less significantly visible. Therefore, the uppermost surface of the protection panel 14 is not concaved, and the boundary 80 is not visible from outside the protection panel 14.

The dent at the boundary 80 between the glass plate 7b and the plastic plate 7a can be made less significantly visible by increasing the thickness of the transparent adhesive agent 16, which attaches the glass plate 7b and the plastic plate 7a to the lower electrode sheet 1. Alternatively, the transparent adhesive agent 16 provided as a liquid easily enters the dent at the boundary 80, so that the dent at the boundary 80 is less significantly visible.

The boundary 80 between the glass plate 7b and the plastic plate 7a is located inside the inner edge end 82 of the double-sided adhesive tape 6 in the frame shape within a dimensional range of from an upper limit value of 1 mm to a lower limit value of 0 mm. If the boundary is located inside the inner edge of the double-sided adhesive tape by a distance exceeding the upper limit value, the double-sided adhesive tape 6 in the frame shape is reduced in width thereof, which results in increased difficulty in attachment. The lower limit value is set to 0 mm. If the boundary 80 is located outside the inner edge 82 of the double-sided adhesive tape 6 in the frame shape by a minus value less than the lower limit value (the boundary 80 is located outside the inner edge end 82 of the double-sided adhesive tape 6), the gap 20 configuring the air layer is eliminated between the upper electrode sheet 3 and the lower electrode sheet 1. Thus, the boundary 80 is located to face the double-sided adhesive tape 6 in the frame shape, so that the dent 81 concaved at the boundary 80 is made visible from outside the protection panel 14.

In a case where the inner edge end 82 of the double-sided adhesive tape 6 in the frame shape is located in the transparent window portion 8a of the decorative sheet 8, the inner edge end 82 of the double-sided adhesive tape 6 is unfavorably visible from outside the protection panel 14. More specifically, the inner edge end 82 of the double-sided adhesive tape 6 in the frame shape is preferably located outside the inner edge end 83 (the outer edge end of the transparent window portion 8a) of the decorative layer 9 of the decorative sheet 8 by approximately 0.3 mm, for example. The inner edge end 82 of the double-sided adhesive tape 6 in the frame shape is located outside the inner edge end 83 (the outer edge end of the transparent window portion 8a) of the decorative layer 9 of the decorative sheet 8 by from 2 mm as the upper limit value to 0.3 mm as the lower limit value. If the inner edge end of the double-sided adhesive tape is located outside the inner edge end of the decorative layer by a distance exceeding the upper limit value, it is difficult to form a narrow frame. If the inner edge end of the double-sided adhesive tape is located outside the inner edge end of the decorative layer by a distance less than the lower limit value, it is difficult to hide the plastic plate 7a.

The decorative layer 9 is usually provided as a printed layer in the protection panel. The printed layer may be formed by a binder made of a resin such as polyvinyl chloride series resin, polyamide series resin, polyester series resin, polyacrylic series resin, polyurethane series resin, polyvinyl acetal series resin, polyester urethane series resin, cellulosic ester series resin, or alkyd resin, as well as by a coloring ink inclusive of pigment or dye in an appropriate color as a coloring agent. The printed layer may be formed by ordinary printing such as offset printing, gravure printing, or screen printing. In particular, offset printing or gravure printing is suitable for polychrome printing or gradation expression. Monochrome printing can adopt coating such as gravure coating, roll coating, or comma coating. The printed layer may be provided on the entire surface or may be partially provided in accordance with a desired decorative pattern.

The decorative layer 9 may be configured by a metal thin film layer or a printed layer combined with a metal thin film layer. The metal thin film layer is adopted as the decorative layer 9 for expressing metallic luster, and can be formed by vacuum vapor deposition, sputtering, ion plating, metal plating, or the like. In such a case, in accordance with the desired color of metallic luster, it is possible to use a metal such as aluminum, nickel, gold, platinum, chromium, iron, copper, tin, indium, silver, titanium, lead, or zinc; an alloy thereof; or a compound thereof. Usually, the metal thin film layer is partially formed. The metal thin film layer may be provided optionally together with a pre-anchor layer or a post-anchor layer in order to improve adhesiveness with a different layer.

The decorative layer 9 can be formed on either one of the surfaces of the transparent resin cover film 8c. In a case where the decorative layer 9 is formed on the lower surface and is attached so as to face the upper surface of the upper electrode sheet 3, the decorative layer 9 is not brought into direct contact with a finger or a pen. Therefore, abrasion of the decorative layer 9 can be prevented.

Alternatively, the decorative sheet 8 may have a hard coating film attached to a surface thereof.

The protection panel main body 7 and the lower electrode sheet 1, as well as the upper electrode sheet 3 and the decorative sheet 8 are bonded with each other by insulative transparent adhesive agents 16 and 19, respectively, which are each made of acrylic resin, epoxy resin, phenol resin, vinyl resin, or the like. The protection panel main body 7 according to the first embodiment of the present invention is configured such that the glass plate 7*b* is fitted in the glass plate fitting opening 7*d* in the plastic plate 7*a*. The plastic plate 7*a* and the glass plate 7*b* attached with the lower electrode sheet 1 are made to be integral with each other.

The FPC 18 can adopt a known flexible printed circuit board. After the protection panel main body 7, the lower electrode sheet 1, the upper electrode sheet 3, and the decorative sheet 8 are attached all together, the end of the FPC 18 provided with the conductive adhesive agent is inserted between the lower electrode sheet 1 and the upper electrode sheet 3. The output terminals 23 and 24 of the upper circuit 5*a* and the lower circuit 5*b* are electrically connected with the end of the FPC 18 provided with the conductive adhesive agent by thermal compression bonding.

The protection panel 14 provided with a touch input function according to the first embodiment of the present invention is thus configured to have a touch input function on the upper surface of the protection panel main body 7. As shown in FIGS. 2B and 2C, an electronic device such as a mobile phone accepts input operations to an outer surface thereof by fitting the protection panel 14 into the panel fitting portion 22 of the casing 13 provided with the opening 17.

As shown in FIG. 2C, the front casing 13 is provided with a concave portion 22 that allows the protection panel 14 to be fitted thereinto. The concave portion 22 preferably has a depth substantially equal to the thickness of the protection panel 14. The opening 17 is formed in the bottom surface of the concave portion 22, and the peripheral edge of the bottom surface supports a peripheral edge portion 12*a* provided with the decorative layer 9 of the protection panel 14.

There is disposed the display device 15 in the opening 17. As shown in FIG. 2C, the casing 13 supports only the peripheral edge portion of the protection panel 14, so that the protection panel 14 can be configured to have a touch input operation screen 12 of a size substantially equal to that of the opening 17. The touch input operation screen 12 can thus be provided in most of the visible region VR of the display, which is visible from outside the casing 13. As apparent from FIG. 2C, there is no difference in height between a front surface 21 of the casing and the touch input operation screen 12, so that sliding operations are evenly performed on the touch input operation screen 12, thereby inhibiting deterioration in touch input function. Moreover, there is no such a difference in height, it is possible to easily wipe off spots of grease or the like adhering to the touch input operation screen 12 upon input operations, as well as it is possible to reduce the thickness of the device.

Described next is an example of the method for manufacturing the protection panel shown in FIG. 1.

The protection panel 14 provided with a touch input function for a display window of an electronic device can be manufactured as follows. A sheet of movable electrode member 31 is attached with a sheet of fixed electrode member 26 at a predetermined position. The sheet of movable electrode member 31 can configure a plurality of sets of upper electrode sheets 3 and decorative sheets 8. The sheet of fixed electrode member 26 can configure a plurality of sets of protection panel main bodies 7 and lower electrode sheets 1. The protection panel is cut out integrally from the attached electrode members.

Figure 3:
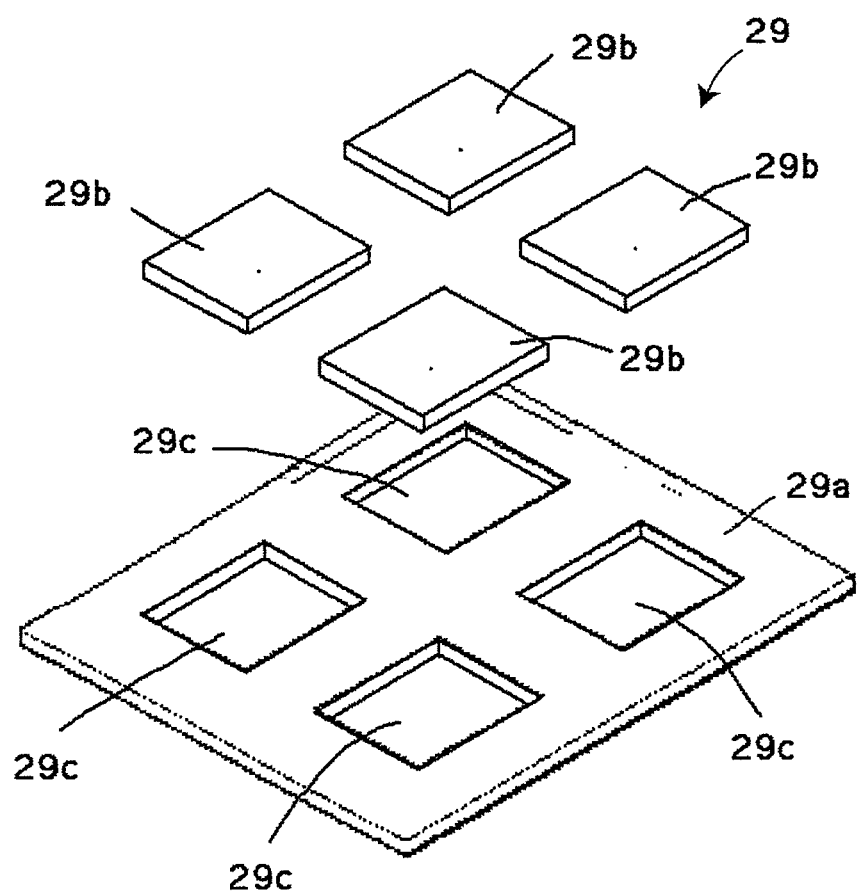
FIG. 3 is an exploded perspective view of a large-sized protection panel main body that is adopted in a method for manufacturing the protection panel provided with a touch input function for a display window of an electronic device according to the first embodiment of the present invention.

FIG. 3 is an exploded perspective view of a large-sized (collective) protection panel main body 29 (a large-sized sheet to configure a large number of protection panel main bodies) which is adopted in the method for manufacturing the protection panel provided with a touch input function for a display window of an electronic device according to the first embodiment of the present invention. Punched out from the large-sized protection panel main body 29 are a plurality of (for example, four in the case of FIG. 3) plastic plates 29*a* each corresponding to a glass plate fitting opening 29*c* (corresponding to the glass plate fitting opening 7*d*). The glass plate fitting opening 29*c* is entirely larger (larger both in the longitudinal direction and the lateral direction) than the transparent window portion 8*a* of a finished product. The glass plates 29*b* are fitted in the glass plate fitting openings 29*c*, respectively. In the example of FIG. 3, the protection panel main body 29 is provided with four punched out portions (glass plate fitting openings) 29*c* in one plastic plate 29*a*. Fitted respectively in the punched out portions (glass plate fitting openings) 29*c* are the glass plates 29*b* of which thickness is identical with that of the glass plate fitting openings 29*c*. It is possible to obtain, from a certain size of a sheet of plastic plate 29*a*, approximately two protection panels for personal computers, or as many as approximately twenty protection panels for vehicle navigation systems or for mobile phones. Each of the punched out portions (glass plate fitting openings) 29*c* is preferably formed slightly larger than the transparent window portion 8*a* both in the longitudinal and lateral dimensions, in view of a variation in size upon attachment with a large-sized decorative sheet 32 to be described later. It is preferable to define the size of the glass plates 29*b* so as to be further slightly smaller than the punched out portion (glass plate fitting opening) 29*c* in the longitudinal and lateral dimensions, in view of a variation in size upon cutting the glass plates 29*b* and a variation in size upon punching out the plastic plate 29*a*.

Figure 4:
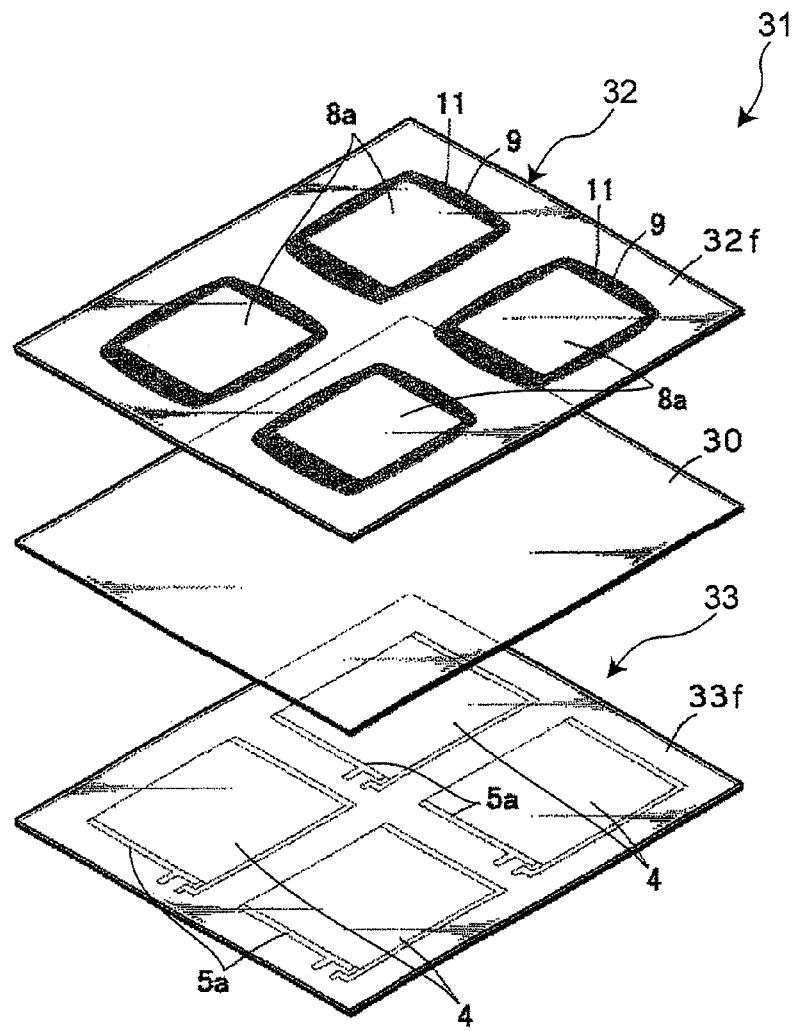
FIG. 4 is an exploded perspective view of an assembly, illustrating the step of assembling a movable electrode member, in the method for manufacturing the protection panel provided with a touch input function for a display window of an electronic device according to the first embodiment of the present invention.

FIG. 4 is an exploded perspective view of an assembly, illustrating the step of assembling the movable electrode member 31, in the method for manufacturing the protection panel provided with a touch input function for a display window of an electronic device according to the first embodiment of the present invention. The movable electrode member 31 is configured by a large-sized upper electrode sheet 33 and a large-sized decorative sheet 32, which are attached with each other by a transparent adhesive agent 25.

The large-sized decorative sheet 32 is provided with a plurality of decorative layers 9, each of which configures the transparent window portion 8*a*, on at least one of surfaces of a large-sized decorative sheet transparent resin film 32*f*. In the example shown in FIG. 4, one large-sized decorative sheet 32 has four decorative layers 9 each configuring the transparent window portion 8*a*. The decorative layers 9 are preferably provided on the surface to be attached with a large-sized upper electrode sheet 33 to be described later.

The large-sized upper electrode sheet 33 is configured such that on a lower surface of a large-sized upper electrode sheet transparent resin film 33*f*, a plurality of quadrilateral upper transparent electrodes 4 and upper circuits 5*a* provided at the peripheries of the upper transparent electrodes 4 are respectively formed. In the example shown in FIG. 4, there are formed four upper transparent electrodes 4 on one large-sized upper electrode sheet 33. The upper transparent electrodes 4 and the upper circuits 5*a* are formed to be smaller than the outer shape dimensions of the decorative portions 11 on the large-sized decorative sheet 32 described above, and are located at the positions corresponding to the decorative layers 9 formed on the large-sized decorative sheet 32, respectively. However, the upper transparent electrodes 4 are formed to be substantially equal to or slightly larger than the transparent window portions 8a of the decorative layers 9, respectively. The upper circuits 5a provided respectively at the peripheries of the upper transparent electrodes 4 are desirably sized to be hidden by the respective decorative portions 11.

The remaining surface of the large-sized upper electrode sheet 33, which is not provided with the upper transparent electrodes 4 and the upper circuits 5a, is bonded by the transparent adhesive agent 30 to the large-sized decorative sheet 32, so as to configure the movable electrode member 31. Attachment in this case is made such that the respective upper circuits 5a are located at positions to be hidden by the decorative portions 11 formed by the decorative layers 9 on the large-sized decorative sheet 32.

Figure 5:
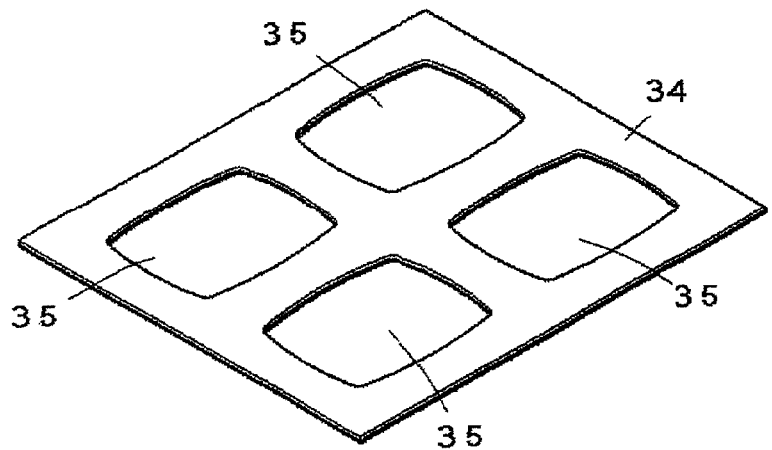
FIG. 5 is a perspective view of a large-sized double-sided adhesive tape adopted in the method for manufacturing the protection panel provided with a touch input function for a display window of an electronic device according to the first embodiment of the present invention.

FIG. 5 is a perspective view of a large-sized double-sided adhesive tape 34 adopted in the method for manufacturing the protection panel provided with a touch input function for a display window of an electronic device according to the first embodiment of the present invention. The large-sized double-sided adhesive tape 34 is sized substantially identically with the movable electrode member 31, and is provided with hollow portions 35 at positions corresponding to the decorative portions 11 on the movable electrode member 31. The hollow portions 35 are larger than the upper transparent electrodes 4, and are smaller than the outer shape dimensions of the decorative portions 11, respectively. As described above, the movable electrode member 31 and the fixed electrode member 26 are bonded with each other by the large-sized double-sided adhesive tape 34 such that the air layer is provided between the electrodes.

Figure 6:
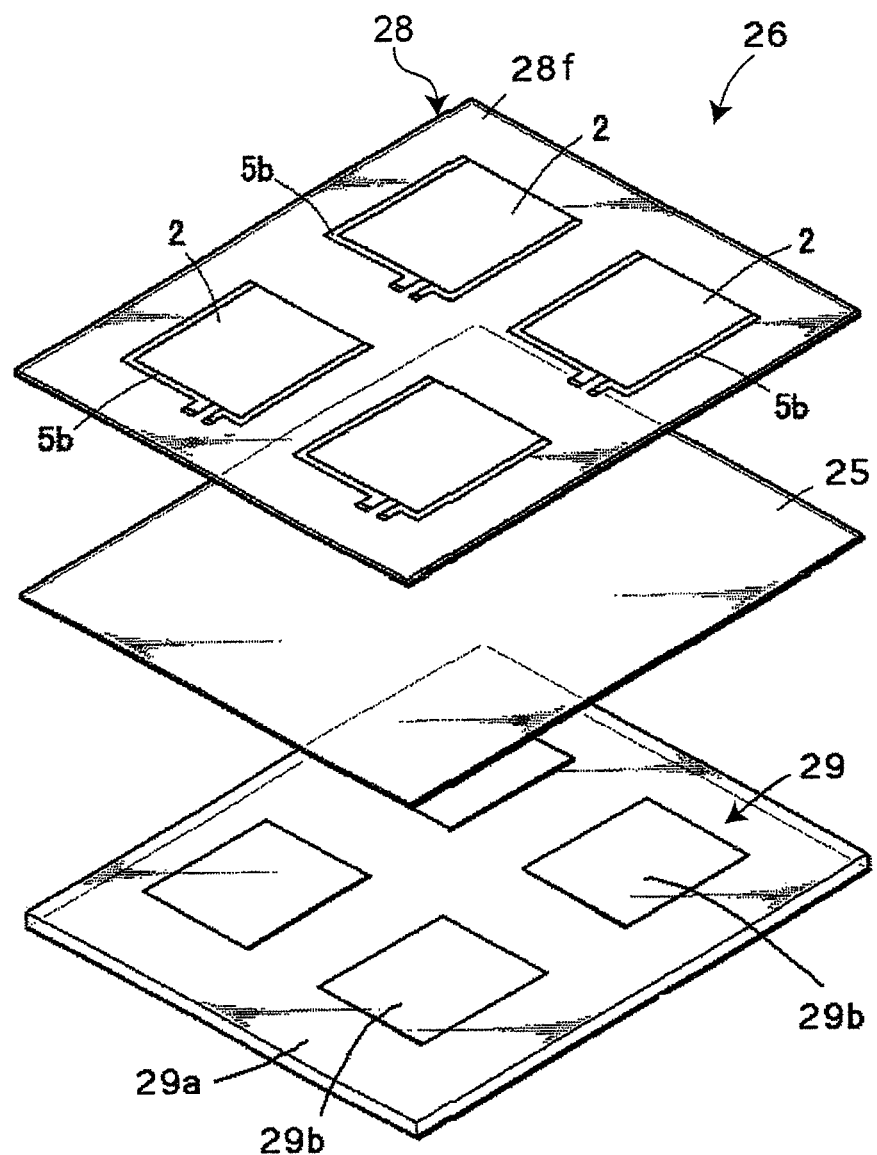
FIG. 6 is an exploded perspective view of an assembly, illustrating the step of assembling a fixed electrode member, in the method for manufacturing the protection panel provided with a touch input function for a display window of an electronic device according to the first embodiment of the present invention.

FIG. 6 is an exploded perspective view of an assembly, illustrating the step of assembling the fixed electrode member 26, in the method for manufacturing the protection panel provided with a touch input function for a display window of an electronic device according to the first embodiment of the present invention. The fixed electrode member 26 is configured such that the large-sized lower electrode sheet 28 is attached to the upper surface of the large-sized protection panel main body 29.

The large-sized lower electrode sheet 28 is configured such that on an upper surface of a large-sized lower electrode sheet transparent resin film 28f, a plurality of quadrilateral lower transparent electrodes 2 and lower circuits 5b provided at the peripheries of the lower transparent electrodes 2 are respectively formed. In the example shown FIG. 6, one large-sized lower electrode sheet 28 has four lower transparent electrodes 2. The lower transparent electrodes 2 and the lower circuits 5b are formed to be smaller than the outer shape dimensions of the decorative portions 11 on the large-sized decorative sheet 32 described above, and to be substantially equal to the upper transparent electrodes 4 and the upper circuits 5a, respectively. The lower transparent electrodes and the lower circuits are located at positions corresponding to the decorative layers 9 formed on the large-sized decorative sheet 32.

The remaining surface of the large-sized lower electrode sheet 28, which is not provided with the upper transparent electrodes 2 and the upper circuits 5b, is bonded by a transparent adhesive agent 25 to the large-sized protection panel main body 29, so as to configure the fixed electrode member 26. The spacers 10 are provided, after attaching the large-sized lower electrode sheet and the large-sized protection panel main body with each other, by forming a large number of minute dots in accordance with the method described above, for example.

Figure 7:
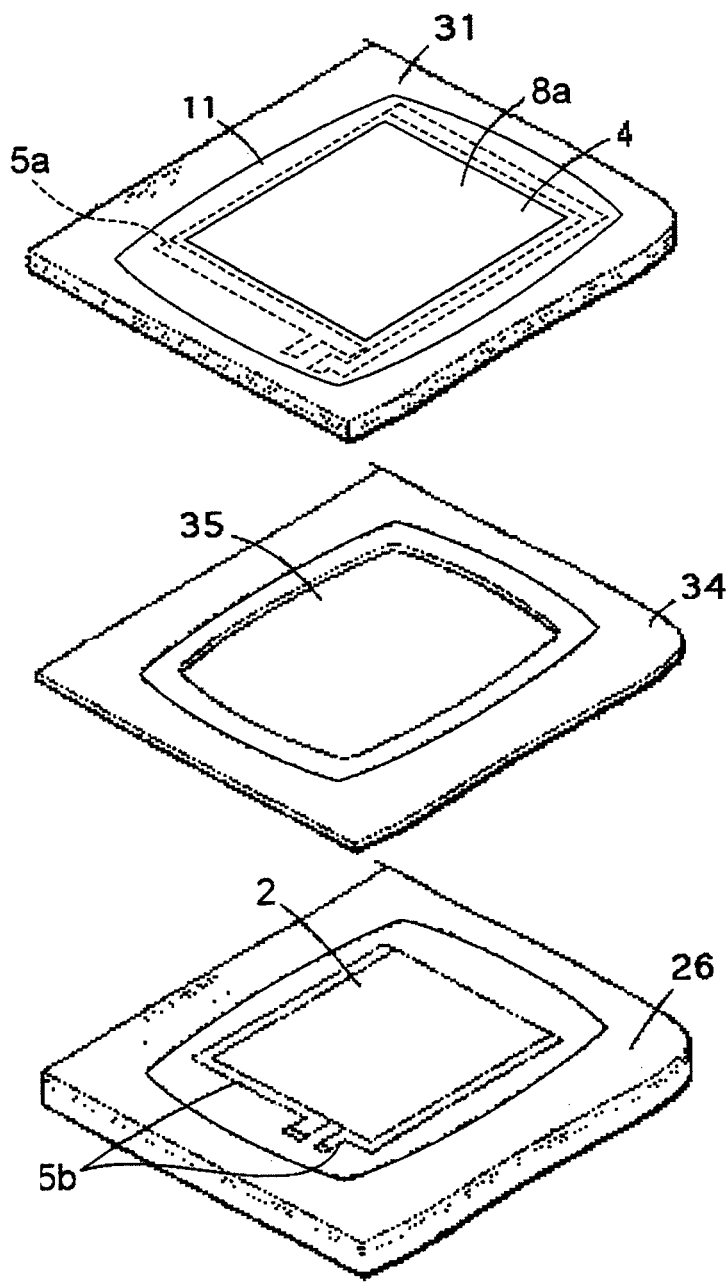
FIG. 7 is an exploded perspective view of an assembly, which is partially enlarged to illustrate positions to attach together the movable electrode member, the large-sized double-sided adhesive tape, and the fixed electrode member, in the method for manufacturing the protection panel provided with a touch input function for a display window of an electronic device according to the first embodiment of the present invention.

The movable electrode member 31 and the fixed electrode member 26 respectively configured as described above are bonded together by the large-sized double-sided adhesive tape 34. The positional relation thereamong in this case is shown in FIG. 7. Specifically, the decorative portion 11 is attached at a position so as not to be out of the upper transparent electrode 4, the upper circuit 5a, the lower transparent electrode 2, the lower circuit 5b, and the hollow portion 35. The attachment is made such that the upper transparent electrode 4 and the lower transparent electrode 2 are fully located within the hollow portion 35 in the large-sized double-sided adhesive tape 34. The respective members are attached together in accordance with this positional relation, so that the upper transparent electrode 4 and the lower transparent electrode 2 are bonded together only on the peripheries thereof by the large-sized double-sided adhesive tape 34, and the movable electrode member 31 and the fixed electrode member 26 are bonded together only on the peripheries thereof via the air layer therebetween.

In the examples shown in FIGS. 3 to 7, the movable electrode member 31 and the fixed electrode member 26 are firstly assembled respectively and then are attached together to form a laminated body. However, the order of the processes are not limited as long as it is possible to finally obtain the laminated body that are formed by the large-sized protection panel main body 29, the large-sized lower electrode sheet 26, the large-sized upper electrode sheet 33, and the large-sized decorative sheet 32 all attached together.

The movable electrode member 31 and the fixed electrode member 26 are bonded together and then are cut integrally. These members are cut at a position outside the outer peripheral edge of the glass plate 29b, the peripheral edge of the hollow portion 35 in the large-sized double-sided adhesive tape 34, and the outer peripheral edges of the upper transparent electrode 4 and the lower transparent electrode 2, as well as in the vicinity of position inside the peripheral edge of the decorative portion 11. There are obtained a plurality of protection panels at one time by integrally cutting at the positions the movable electrode member 31 and the fixed electrode member 26 attached together. In the example shown in FIGS. 3 to 6, there are obtained four protection panels by cutting once. In a case of fabricating the protection panel 14 shown in FIG. 1, the through holes 70 to 73 for a loudspeaker or the like are opened at this stage.

The first embodiment of the present invention adopts the large-sized protection panel main body 29 that is configured by the plastic plate 29a including the plurality of glass plate fitting openings 29c being punched out, and the glass plates 29b respectively fitted in the glass plate fitting openings 29c. Accordingly, such a outer shape is easily processed to the plastic plate 29a. Moreover, there are obtained at one time the plurality of protection panels each provided with a touch input function by integrally cutting the movable electrode member 31 and the fixed electrode member 26 attached together, resulting in short takt time. The outer shape is processed by die cutting (punching out processing), router processing, laser processing, or the like.

After obtaining each of the protection panels, the end of the FPC 18 provided with the conductive adhesive agent is laterally inserted between the lower electrode sheet 1 and the upper electrode sheet 3, and is connected with the output terminals 23 and 24 of the upper circuit 5a and the lower circuit 5b by thermal compression bonding (see FIGS. 1 and 2A).

It is noted that the present invention is not limited to the first embodiment but can be realized in other various modes.

For example, upon formation of both or either one of the lower transparent electrode 2 and the upper transparent electrode 4, the conductive coating sheet is formed entirely and then the unnecessary portion is removed by etching. In this case, the unnecessary portion may not be removed by etching but may be covered with an insulative layer. Adoptable as the insulative layer is acrylic acrylate resin or the like. The insulative layer is formed by screen printing, photo processing, or the like. Alternatively, the insulative layer may be provided by patterning with use of laser. Further alternatively, this insulative layer may serve as the adhesive agent to be used for attachment.

Figure 10:
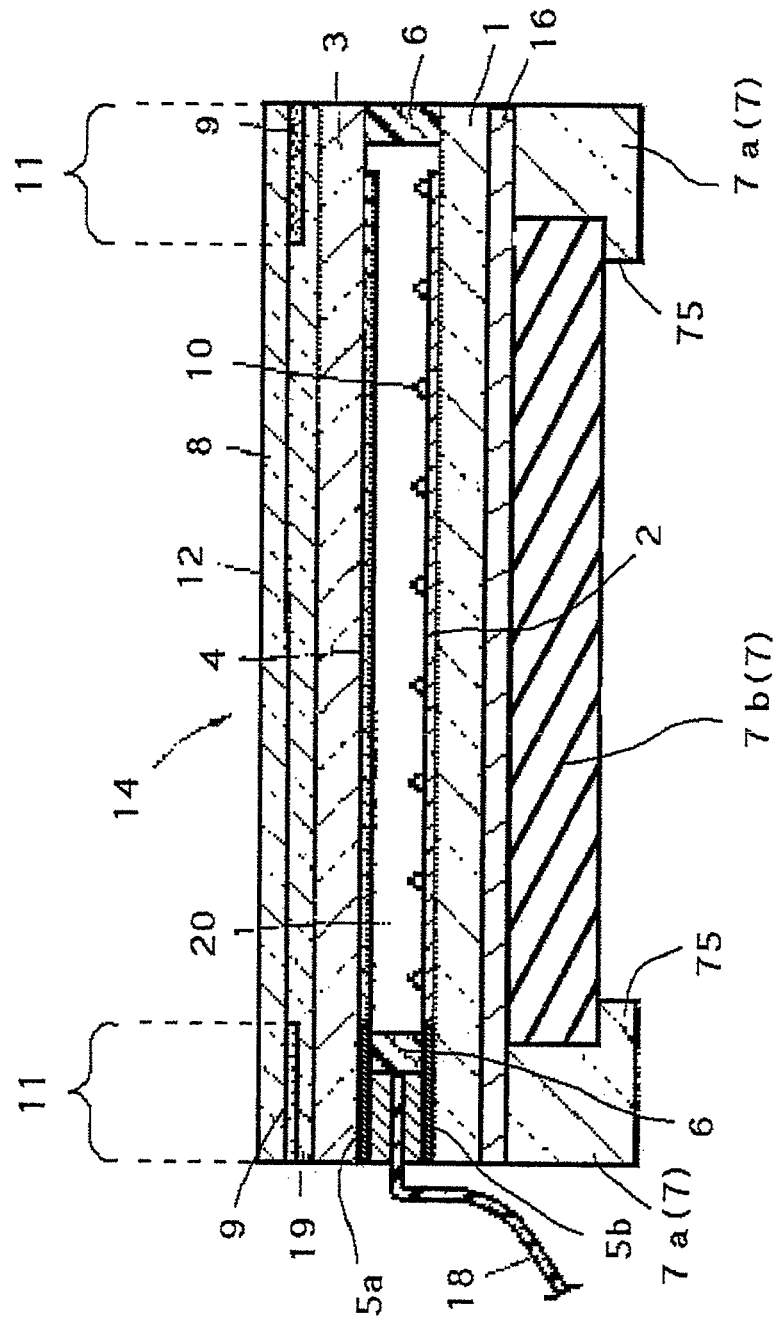
FIG. 10 is a cross sectional view of a protection panel provided with a touch input function for a display window of an electronic device according to another embodiment of the present invention.
Figure 11:
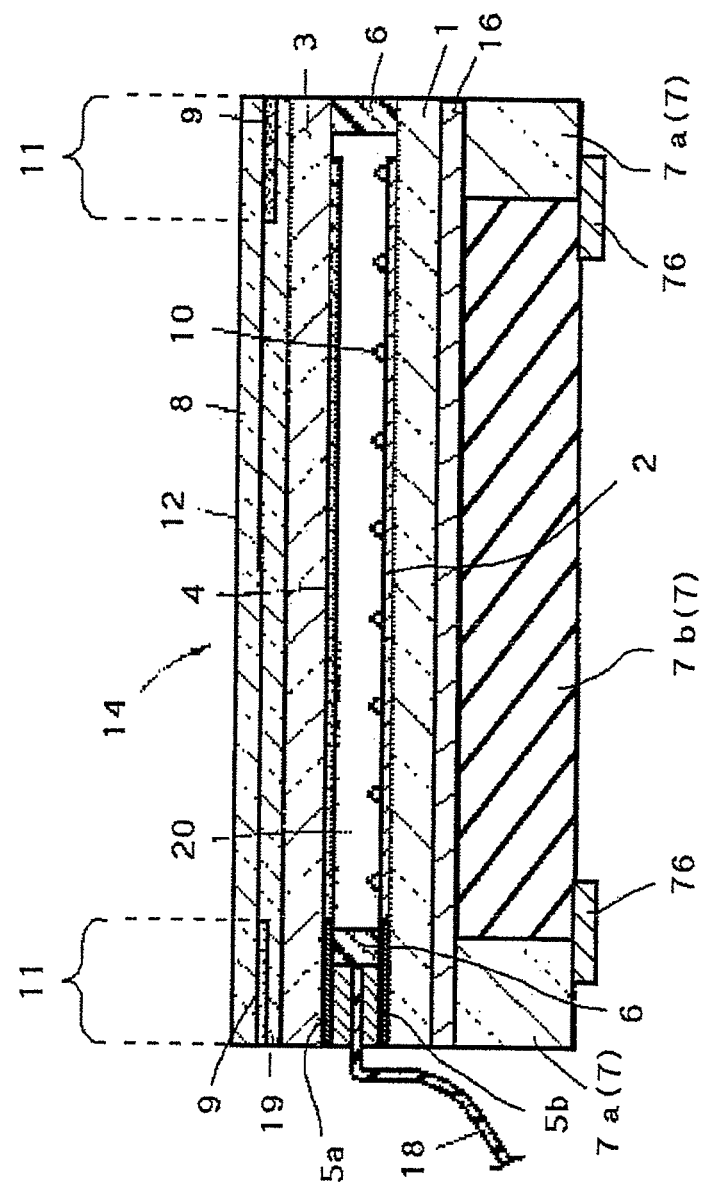
FIG. 11 is a cross sectional view of a protection panel provided with a touch input function for a display window of an electronic device according to still another embodiment of the present invention.
Figure 12:
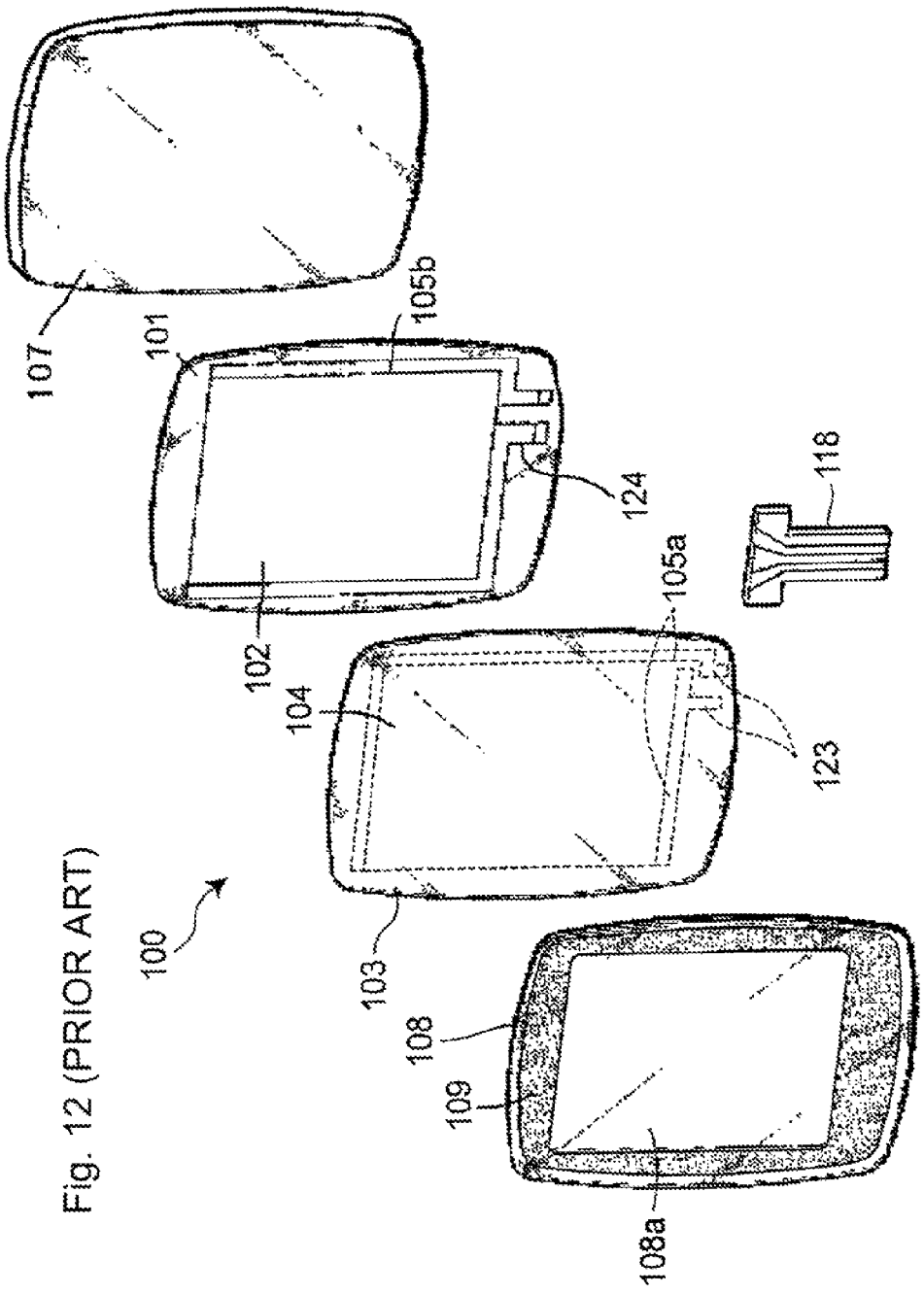
FIG. 12 is an exploded view of a protection panel provided with a touch input function for a display window of an electronic device according to a conventional art.
Figure 13:
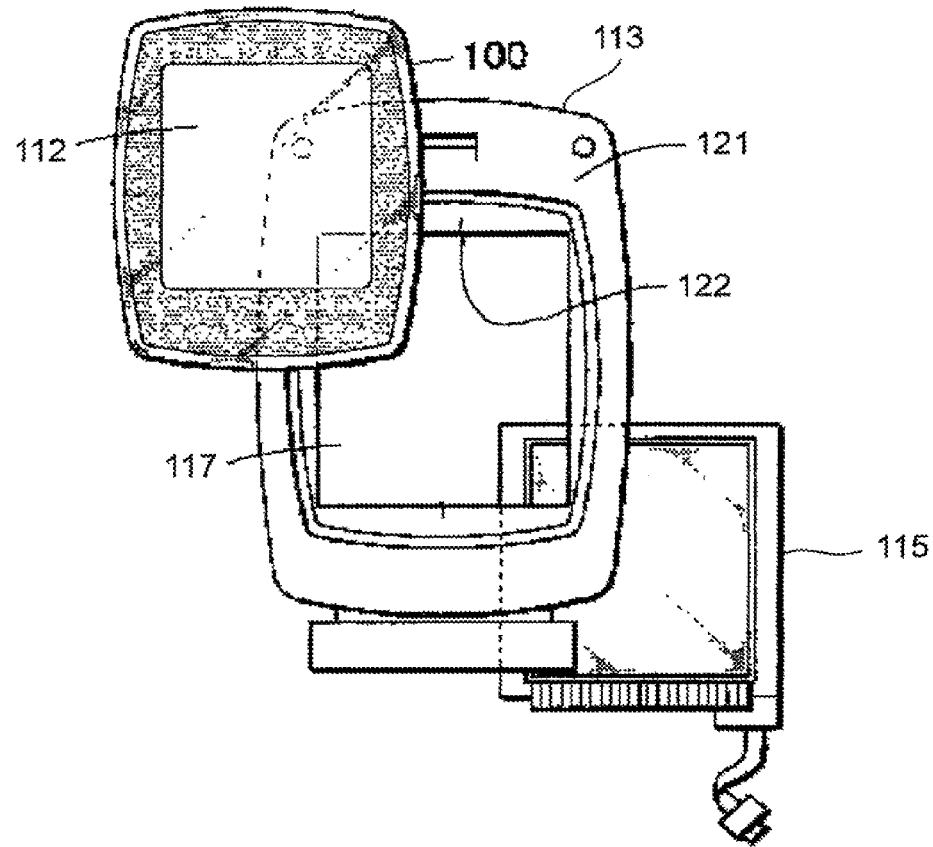
FIG. 13 is an exploded view of an example of a mount structure in a casing with use of a protection panel provided with a touch input function for a display window of an electronic device.
Figure 14:
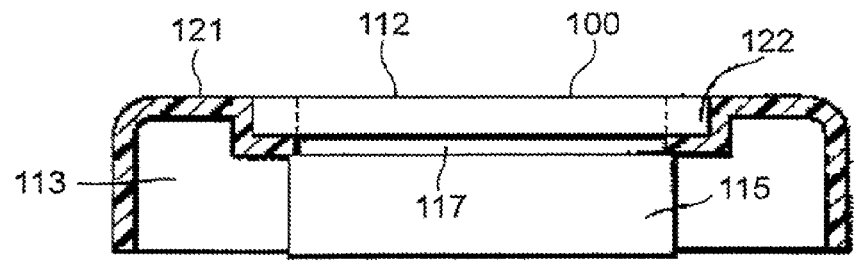
FIG. 14 is a cross sectional view of the example of the mount structure in the casing of FIG. 13.
Figure 15:
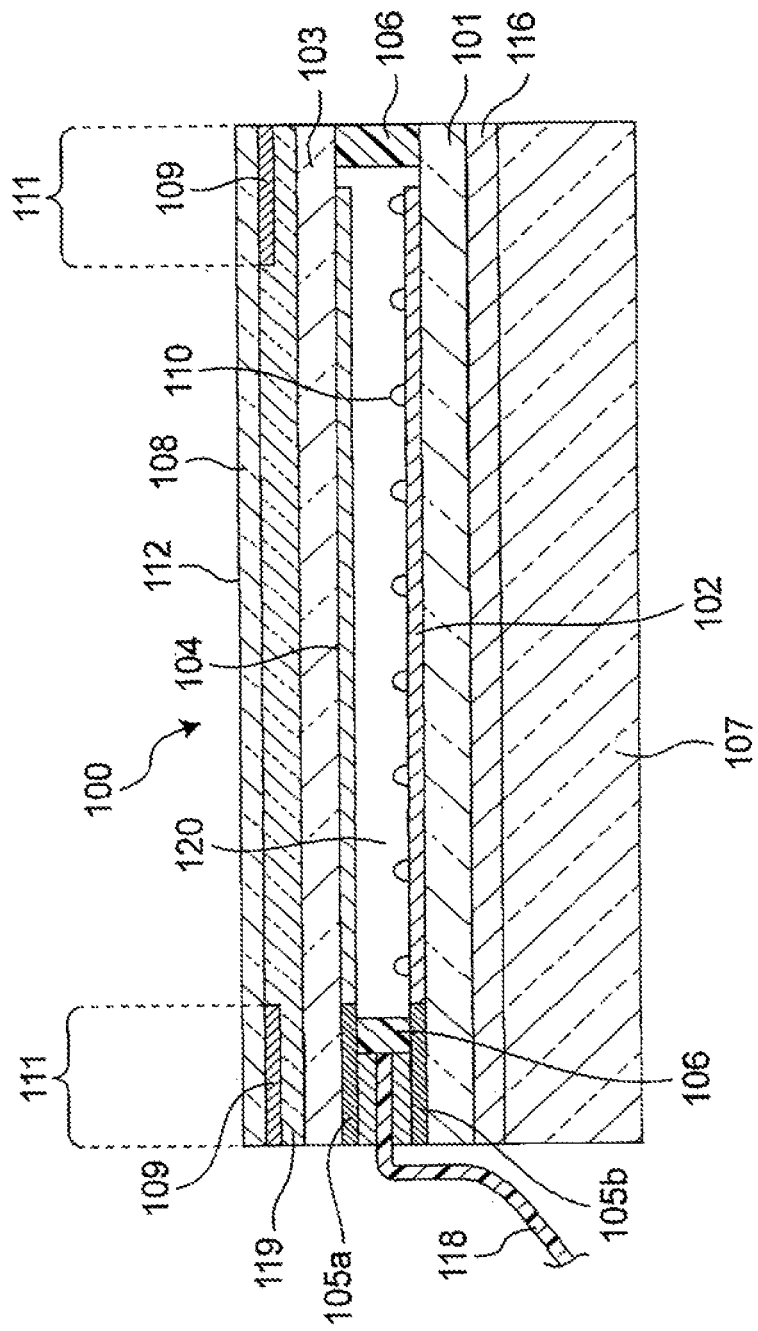
FIG. 15 is a cross sectional view of the protection panel shown in FIG. 12.

In the example shown in FIG. 2A, the plastic plate 7a and the glass plate 7b are provided integrally with each other by being attached to the lower electrode sheet 1. The engagement between these plates can be further reinforced. For example, as shown in FIG. 10 illustrating another embodiment, only in a case where the plastic plate 7a is thicker than the glass plate 7b, the plastic plate is additionally provided with a support portion 75 that has an L-letter shape in cross section and supports the peripheral edge of the rear surface of the glass plate 7b. Alternatively, as in still another embodiment shown in FIG. 11, the engagement between the plates may be reinforced by attaching an adhesive tape 76 in a band shape or a quadrilateral frame shape along the rear surfaces of the plastic plate 7a and the glass plate 7b.

Instead of laterally inserting the end of the FPC 18 between the lower electrode sheet 1 and the upper electrode sheet 3, the protection panel main body 7 may be provided in the peripheral edge portion thereof with a through hole so that all the terminals of the circuits 5a and 5b are led out to the rear surface of the protection panel main body 7. The first embodiment of the present invention adopts the protection panel main body 7 that is configured by the plastic plate 7a including the glass plate fitting opening 7d punched out, and the glass plate 7b fitted in the glass plate fitting opening 7d. Accordingly, the protection panel main body is easily processed and the cost therefor is lower than that for the protection panel main body entirely configured only by the glass plate, as in the above case of opening the holes for a loudspeaker and the like. In this case, the terminals of the circuits 5a and 5b are provided on the lower surface of the protection panel main body 7. Accordingly, a terminal to be in contact with the terminal of the protection panel is preferably provided on a bottom surface of the concave portion 22 of the casing, which supports the protection panel.

Figure 8:
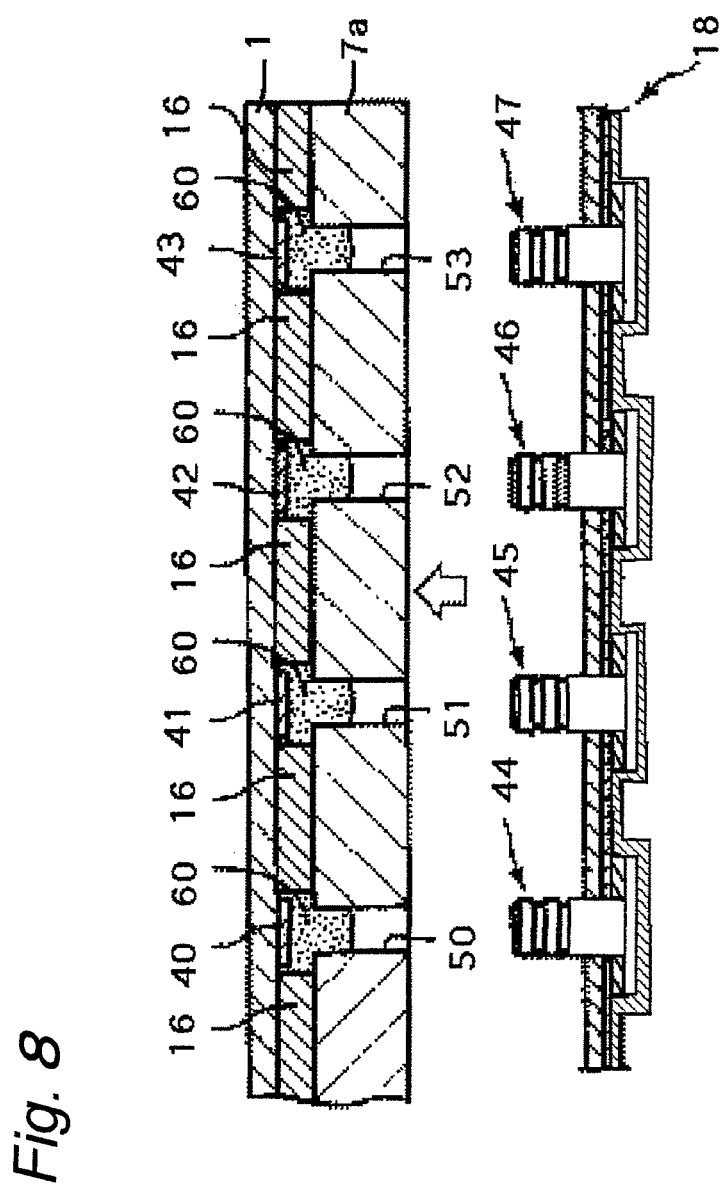
FIG. 8 is a partially-enlarged cross sectional view illustrating an ultrasonic insert technique that is adopted for connection with an FPC provided with pins, in the method for manufacturing the protection panel provided with a touch input function for a display window of an electronic device according to the first embodiment of the present invention.

In the case where the terminals are connected with each other via a through hole, as disclosed in the Pamphlet of International Publication No. 2006/077784, adopted in correspondence with the through holes 50 to 53 in the plastic plate 7a may be four metal pins 44 to 47, which stand on the connection end of the FPC 18 and are respectively connected with the electrode terminals 40, 41, 42, and 43 by way of a conductive adhesive agent 60. Adopted in the first embodiment of the present invention is the protection panel main body 7 that is configured by the plastic plate 7a and the glass plate 7b fitted in the glass plate fitting opening 7d. Accordingly, it is possible to apply an ultrasonic insert technique upon connecting the FPC provided with pins (see FIG. 8). In accordance with the ultrasonic insert technique, the through holes 50 to 53 are set to have diameters in the ranges between equal to and smaller by approximately 30% relative to the outer diameters of the metal pins 44 to 47, respectively. Shaft portions of the metal pins 44 to 47 are pressed into the through holes 50 to 53, while ultrasonic vibration and pressure are applied to a head of each of the metal pins 44 to 47 with use of an ultrasonic insert device. In this method, there is locally caused frictional heat on the boundary surfaces between the shaft portions of the metal pins 44 to 47 and the through holes 50 to 53. Accordingly, the shaft portions of the metal pins are inserted into the through holes 50 to 53 with resin configuring wall surfaces of the through holes being melt. The resin is solidified again to achieve firm fixation. To the contrary, in the case where the protection panel main body is entirely configured only by the glass plate, the ultrasonic insert technique cannot be adopted as the pins cannot be inserted while melting the glass plate.

The double-sided adhesive tape 7 may be replaced by an adhesive agent that is made of acrylic resin, epoxy resin, phenol resin, vinyl resin, or the like.

Further, hard coating may be applied onto the surface of the protection panel 14. In the case where such hard coating is applied, even when the decorative layer 9 is formed on the upper surface of the decorative sheet 8, the decorative layer 9 is adequately protected by the hard coating layer from abrasion, which is caused by press operations with a finger or a pen. Such hard coating is obtained by applying a hard coating material of acrylic resin, silicon resin, UV curable resin, or the like, or by attaching a hard coating film.

In the case where the glass plate 7b and the plastic plate 7a serving as a resin frame are fixed each other by fitting as described above, there should be a gap between the glass plate 7b and the plastic plate 7a as the resin frame, in view of a variation in size upon fitting. Another method adopts the ultrasonic insert technique, in which case there is no need to provide such a gap. More specifically, in accordance with the ultrasonic insert technique, while melting the plastic plate 7a as the resin frame including an opening smaller than the glass plate 7b, the glass plate 7b is fitted in the opening smaller than the glass plate 7b. Consequently, it is possible to integrally fit the glass plate 7b in the plastic plate 7a with no gap being formed therebetween. More specifically, in the ultrasonic insertion technique, the glass plate 7b is located above the plastic plate 7a as the synthetic resin frame. The glass plate 7b is entirely pressed into the small opening in the plastic plate 7a while applying ultrasonic vibration and pressure with use of a plate member. Alternatively, the plastic plate 7a as the resin frame is located above the glass plate 7b. The glass plate 7b is pressed relatively into the small opening in the plastic plate 7a as the resin frame while applying ultrasonic vibration and pressure with use of a plate member. In this case, due to the ultrasonic vibration applied upon pressing, the glass plate 7b and the plastic plate 7a as the resin frame are frictioned with each other on the contact portions therebetween to generate heat, which melts the resin in the frictioned portion of the plastic plate 7a. Therefore, it is possible to easily fit the glass plate 7b in the plastic plate 7a as the resin frame. After the glass plate is fitted in, the melted portion of the plastic plate 7a as the resin frame is solidified again. The glass plate 7b has a minute irregular end surface unless being smoothed. The melted resin is filled into the irregular surface and is cooled and solidified again, thereby exerting an anchor effect. The glass plate 7b and the plastic plate 7a as the resin frame are less likely to be disengaged from each other.

Figure 20:
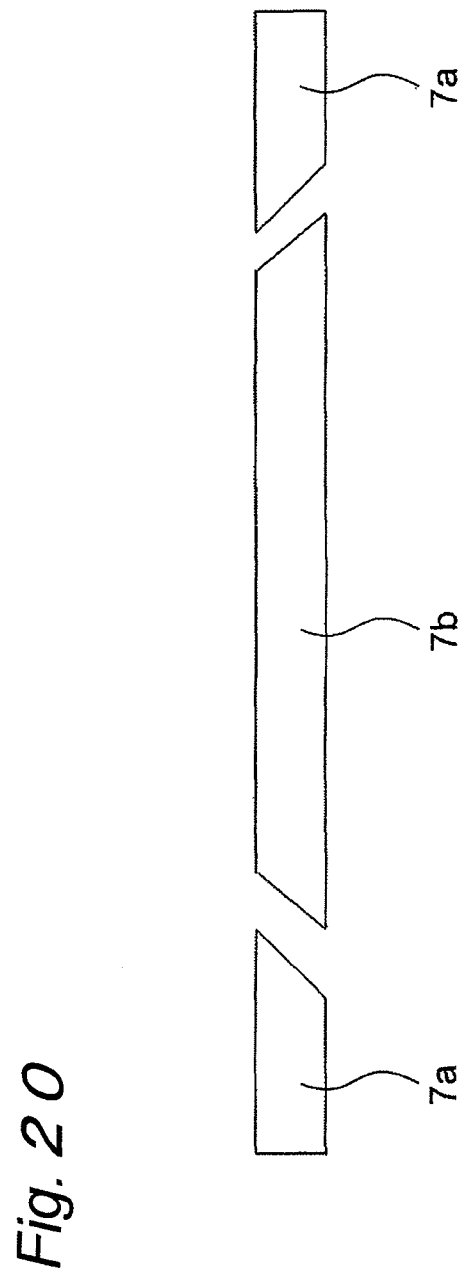
FIG. 20 is a schematic cross sectional view illustrating that, in a protection panel provided with a touch input function for a display window of an electronic device according to a still different embodiment of the present invention, a force applied to a plastic plate in a frame shape can be received by an inclined inner end surface of a glass plate.

The end surface on the end edge of the glass plate 7b is not limited to have an orthogonally-placed cross section, but may be inclined. More specifically, as in still another embodiment shown in FIG. 20, the glass plate 7b may be formed to have a trapezoidal shape with a lower side being longer than an upper side in vertical cross section, and the glass plate fitting opening 7d in the plastic frame plate 7a may be formed to have an inner end surface inclined so as to receive the glass plate, so that a force applied to the plastic frame plate 7a is received by the inclined inner end surface of the glass plate 7b. This configuration provides a protection panel more stably supported. More specifically, as the end surface of the glass plate 7b is directed upward (the right end portion shown in FIG. 20 being inclined rightward and downward from the top), the plastic plate 7a can be securely supported by the glass plate 7b. As a result, it is possible to configure a stable protection panel main body 7. On the other hand, in a case where the end surface of the glass plate 7b is directed downward (the right end portion shown in FIG. 20 being inclined rightward and upward from the bottom), the glass plate 7b is difficult to securely support the plastic plate 7a.

Working Example 1

A polycarbonate resin plate of 0.4 mm thick and 500 mm each in length and width was punched out by die cutting. Totally twenty glass plate fitting openings 29c were punched out so as to be aligned into five columns and four rows. The outer shape of each of the glass plate fitting openings was made larger by +0.7 mm each in length and width with respect to the transparent window portion 8d of 70 mm long and 50 mm wide of a finished product. Accordingly, there was obtained a plastic plate 29a. Subsequently, tempered glass plates 29b of 0.4 mm thick, with the outer shape larger by +0.6 mm each in length and width with respect to the transparent window portion, were respectively fitted in the punched out portions (glass plate fitting openings) to prepare a large-sized protection panel main body 29.

An ITO film of 20 nm thick was formed by sputtering on one entire surface of a PET film that serves as a large-sized lower electrode sheet transparent resin film of 0.1 mm thick with the length and width same as those of the large-sized protection panel main body 29. The ITO film was left in visible regions corresponding to the transparent window portions, while removing the ITO film in the peripheral edge portions not corresponding to the transparent window portions. There were thus obtained twenty transparent electrodes each in a quadrilateral shape longer in width. Formed by screen printing a silver paste were bus bars and circuits for performing external outputs respectively from the bus bars. The bus bars are disposed on two sides facing the lateral sides of each of the transparent electrodes. Further, there were formed a large number of minute dot spacers by screen printing, thereby obtaining a large-sized lower electrode sheet.

There was provided a pressure sensitive adhesive (PSA) of 0.025 mm thick on the upper surface of the large-sized protection panel main body. Thereafter, the large-sized lower electrode sheet was attached to the PSA so as to be in contact with the surface not provided with the transparent electrodes. Thus obtained was a fixed electrode member provided with the transparent electrodes.

Used as a large-sized upper electrode sheet transparent resin film was a PET film of 125 μm with the length and width same as those of the fixed electrode member. An ITO film of 20 nm thick was formed by sputtering on one entire surface of the PET film. The ITO film was left in visible regions corresponding to the transparent window portions, while removing the ITO film in the peripheral edge portions not corresponding to the transparent window portions. There were thus obtained twenty transparent electrodes each in a quadrilateral shape longer in width. Formed by screen printing a silver paste were bus bars and circuits for performing external outputs respectively from the bus bars. The bus bars are disposed on two sides facing the longitudinal sides of each of the transparent electrodes. Thus obtained was a large-sized upper electrode sheet.

Used as a large-sized decorative sheet transparent resin film was a PET film of 50 μm thick with the length and width same as those of the fixed electrode member. Formed on one of the surfaces by gravure printing were twenty decorative layers configuring transparent window portions, thereby obtaining a large-sized decorative sheet. A PET based hard coating film of 5125 μm thick with the length and width same as those of the fixed electrode member was attached with use of a PSA of 0.025 mm thick to the large-sized decorative sheet on the surface not provided with the decorative layers.

The hard-coated large-sized decorative sheet was then attached with the large-sized upper electrode sheet with use of a PSA of 0.025 mm thick to obtain a movable electrode member. These sheets were attached together such that the surface provided with the decorative layers of the large-sized decorative sheet was made in contact with the surface not provided with the transparent electrodes of the large-sized upper electrode sheet.

Thereafter, the fixed electrode member and the movable electrode member were disposed to face each other via the electrodes respectively formed thereon. The fixed electrode member and the movable electrode member were attached together with use of a large-sized double-sided adhesive tape of the size same as these members. The large-sized double-sided adhesive tape is provided with hollow portions at positions corresponding to the positions of the decorative portions provided on the movable electrode member. The movable electrode member and the fixed electrode member are bonded with each other with an air layer being provided between the electrodes thereof.

The movable electrode member and the fixed electrode member having been attached together were integrally cut by die cutting along the inner peripheral edges of twenty decorative patterns. There were thus obtained twenty protection panels. At this stage of obtaining the respective protection panels, opened in each of the panels was a through hole for a mechanical switch.

Finally, in each of the protection panels, the end of the FPC was laterally inserted between the movable electrode member and the fixed electrode member, and thermal compression bonding was performed to obtain a protection panel provided with a touch input function for a display window of an electronic device.

Working Example 2

This working example is similar to Working Example 1 except that a polycarbonate resin plate to serve as a large-sized protection panel main body is provided with through holes into which pins of FPCs provided with pins are inserted, a movable electrode member and a fixed electrode member attached together are cut integrally, and then, the FPC provided with pins is connected to each of the protection panels from the rear surface of the protection panel main body by applying the ultrasonic insert technique.

This protection panel enables touch input operations on a display window of an electronic device such as a mobile phone, has a touch input operation screen on which sliding operations are not repeatedly performed on a particular portion, and from which spots of grease can be easily wiped off.

It is noted that, among the various embodiments and modifications described above, appropriate combinations of the arbitrary embodiments and modifications exert respective effects thereof.

INDUSTRIAL APPLICABILITY

The protection panel provided with a touch input function for a display window of an electronic device according to the present invention exerts the advantages of a protection panel main body configured by a glass plate and advantages of a protection panel main body configured by a plastic plate. The protection panel is useful in a handheld information terminal such as a PDA (personal digital assistant) or a handy terminal, an OA (office automation) device such as a copier or a facsimile, a smartphone, a mobile phone, a handheld game machine, an electronic dictionary, a vehicle navigation system, a small PC (personal computer), various types of home electric appliances, or the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A protection panel provided with a touch input function for a display window of an electronic device, the protection panel being fitted and retained with no gap in a panel fitting portion of a casing provided with an opening such that an outer surface of the protection panel forms one plane together with a periphery of the casing, and protecting a display device disposed therebelow so as to be externally visible through a transparent window portion, the protection panel comprising:
a protection panel main body including a plastic plate having a glass plate fitting opening punched out so as to be larger than the transparent window portion, and a glass plate fitted in the glass plate fitting opening;
a lower electrode sheet including a transparent resin film for the lower electrode sheet, a lower transparent electrode in a quadrilateral shape, and a lower circuit surrounding the lower transparent electrode, the lower transparent electrode and the lower circuit being provided on an upper surface of the transparent resin film for the lower electrode sheet, the lower electrode sheet being attached to an upper surface of the plastic plate and an upper surface of the glass plate of the protection panel main body;
an upper electrode sheet including a transparent resin film for the upper electrode sheet, an upper transparent electrode in a quadrilateral shape, and an upper circuit surrounding the upper transparent electrode, the upper transparent electrode and the upper circuit being provided on a lower surface of the transparent resin film for the upper electrode sheet, the upper electrode sheet being bonded to the lower electrode sheet at peripheral edges thereof so as to form a gap between the lower transparent electrode and the upper transparent electrode; and
a decorative sheet including a transparent resin film for the decorative sheet, and a decorative layer that is provided on at least one surface of the transparent resin film for the decorative sheet so as to hide the lower circuit and the upper circuit and form the transparent window portion, the decorative sheet being attached to an upper surface of the upper electrode sheet.

2. The protection panel provided with a touch input function for a display window of an electronic device according to claim 1, further comprising:
an FPC connected with respective output terminals of the lower circuit and the upper circuit.

3. A method for manufacturing a protection panel for a display window of an electronic device, the protection panel being fitted and retained with no gap in a panel fitting portion of a casing provided with an opening such that an outer surface of the protection panel forms one plane together with a periphery of the casing, and protecting a display device disposed therebelow so as to be externally visible through a transparent window portion, the method comprising:
forming a collective protection panel main body including a plastic plate having a plurality of glass plate fitting openings punched out so as to be larger than the transparent window portion, and glass plates respectively fitted in the glass plate fitting openings;
forming a collective lower electrode sheet including a plurality of lower transparent electrodes in a quadrilateral shape, and a plurality of lower circuits arranged respectively at peripheries of the lower transparent electrodes, the lower transparent electrodes and the lower circuits being provided on an upper surface of a transparent resin film for the collective lower electrode sheet;
forming a collective upper electrode sheet including a plurality of upper transparent electrodes in a quadrilateral shape, and a plurality of upper circuits arranged respectively at peripheries of the upper transparent electrodes, the upper transparent electrodes and the upper circuits being provided on a lower surface of a transparent resin film for the collective upper electrode sheet;
forming a collective decorative sheet including decorative layers provided on at least one surface of a transparent resin film for the collective decorative sheet so as to hide the lower circuits and the upper circuits and form the plurality of transparent window portions; and
attaching the collective lower electrode sheet on an upper surface of the plastic plate and an upper surface of the glass plates of the collective protection panel main body, attaching the collective upper electrode sheet to the collective lower electrode sheet such that air spaces are provided between the electrodes, and attaching the collective decorative sheet on an upper surface of the collective upper electrode sheet to obtain a laminated body.

4. The protection panel provided with a touch input function for a display window of an electronic device according to claim 2, wherein the plastic plate has through holes.

5. The protection panel provided with a touch input function for a display window of an electronic device according to claim 1, wherein the plastic plate has through holes.

* * * * *